(12) United States Patent
Van De Voorde

(10) Patent No.: US 6,335,829 B1
(45) Date of Patent: Jan. 1, 2002

(54) PROJECTION SCREEN FOR IMAGE REPRODUCTION DEVICES WHICH ARE POSITIONED NEXT TO AND/OR ABOVE ONE ANOTHER

(75) Inventor: Tommy Van De Voorde, Kemzeke (BE)

(73) Assignee: Barco N.V., Poperinge (BE)

( * ) Notice: Subject to any disclaimer, the term of this patent is extended or adjusted under 35 U.S.C. 154(b) by 0 days.

(21) Appl. No.: 09/520,608

(22) Filed: Mar. 7, 2000

Related U.S. Application Data

(63) Continuation of application No. PCT/BE98/00133, filed on Sep. 9, 1998.

(30) Foreign Application Priority Data

Sep. 9, 1997 (BE) ...................................................... 9700736

(51) Int. Cl.⁷ ................................................ G03B 21/56
(52) U.S. Cl. ........................................................ 359/449
(58) Field of Search ................................... 359/443, 449, 359/460

(56) References Cited

U.S. PATENT DOCUMENTS

| | | | |
|---|---|---|---|
| 4,895,429 A | * 1/1990 | Iwahara et al. | 359/460 |
| 5,011,277 A | 4/1991 | Ogino et al. | 353/94 |
| 5,085,495 A | 2/1992 | Iwahara et al. | 359/455 |
| 5,206,760 A | * 4/1993 | Nakashima et al. | 359/443 |
| 5,461,510 A | * 10/1995 | Vilnes | 359/449 |
| 5,640,272 A | * 6/1997 | Furuya et al. | 359/457 |
| 5,818,639 A | * 10/1998 | Furuya | 359/455 |
| 6,084,707 A | * 7/2000 | Maruyama et al. | 359/460 |

OTHER PUBLICATIONS

Patent Abstracts of Japan vol. 96, No. 10, Oct. 31, 1996 & JP 08 152677 A (Mitsubishi Electric Corp.), Jun. 11, 1996, see abstract.

* cited by examiner

Primary Examiner—Christopher E. Mahoney
(74) Attorney, Agent, or Firm—Pillsbury Winthrop LLP

(57) ABSTRACT

A multi-screen display for rear projection applications includes a supporting structure and a screen comprising a plurality of screen panels which are positioned and attached to one another and to attachment plates by joining wires. The seams between the screen panels are minimal, specifically less than half of a millimetre wide, even in the event of relatively inaccurate installation of the projection screen, in spite of manufacturing tolerances and under changing climatological conditions, such as temperature and relative atmospheric humidity, owing to the fact that the attachment plates to which the screen panels are fixed using the joining wires are deformable and/or movably joined to the supporting structure.

26 Claims, 14 Drawing Sheets

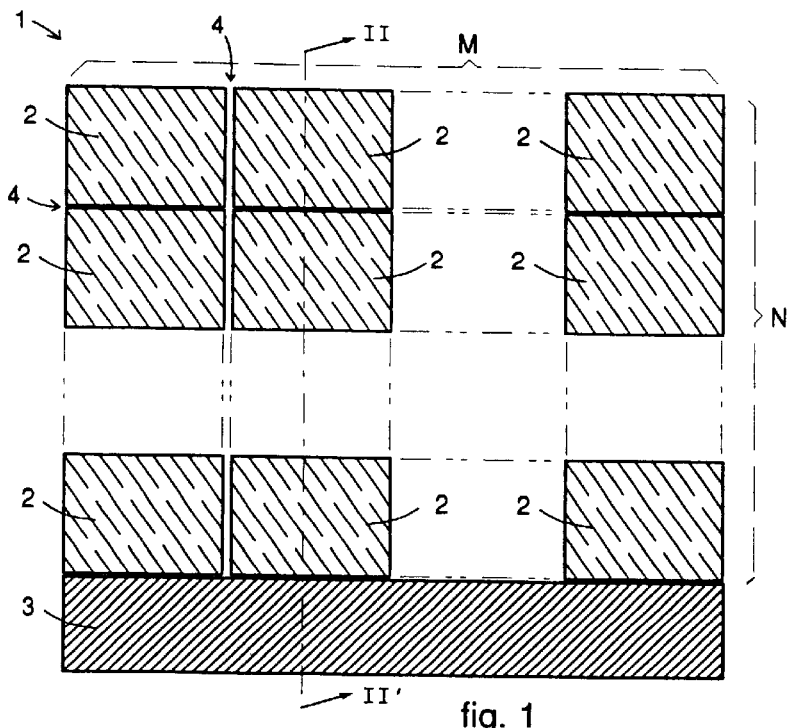
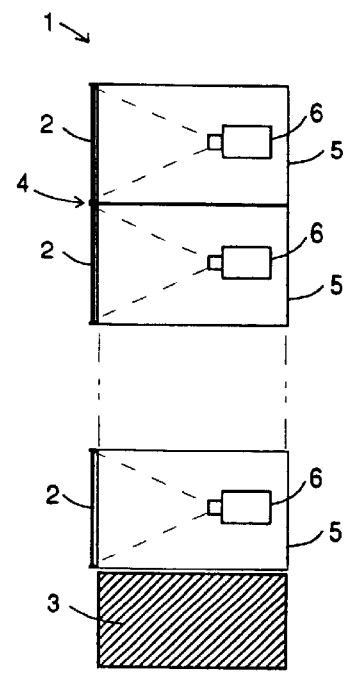
fig. 1 PRIOR ART
fig. 2 PRIOR ART
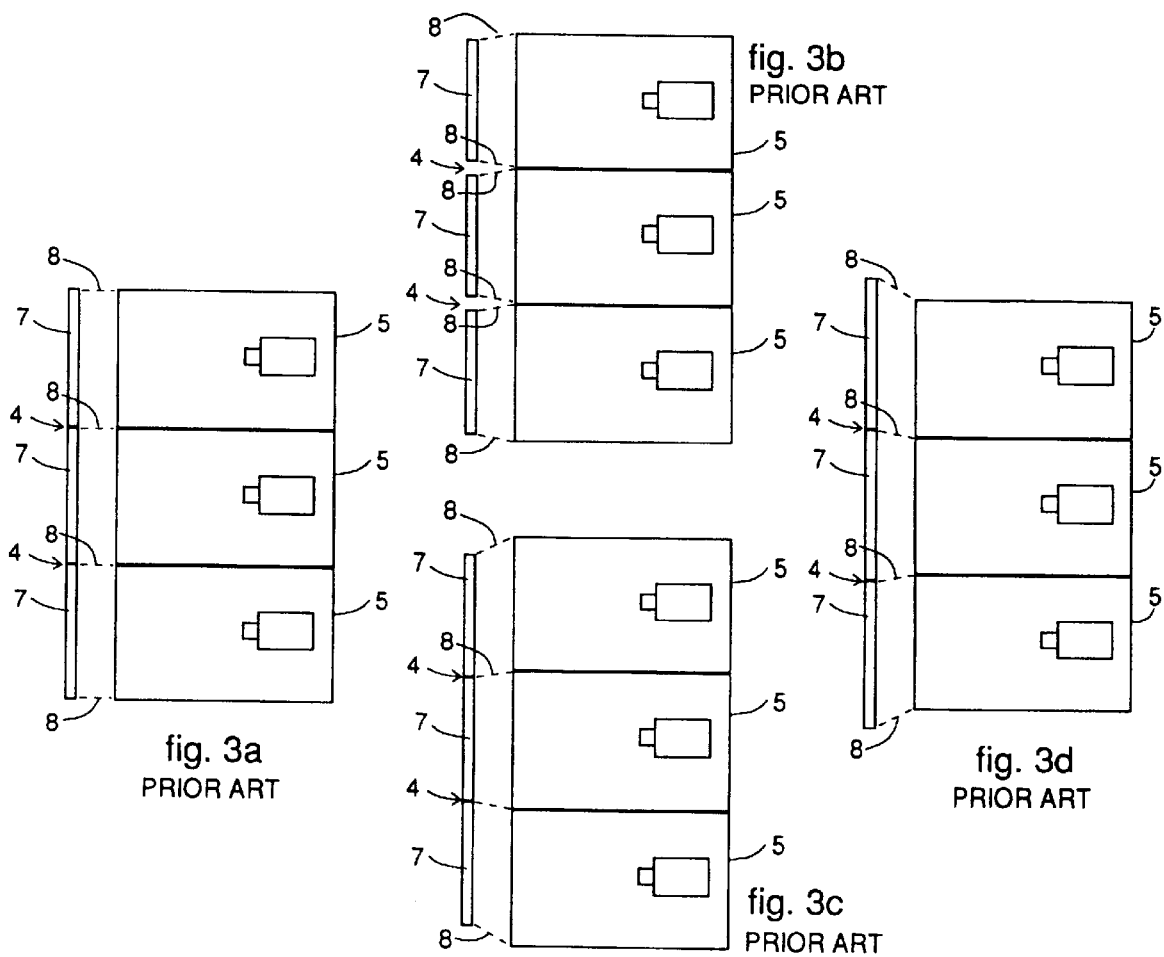
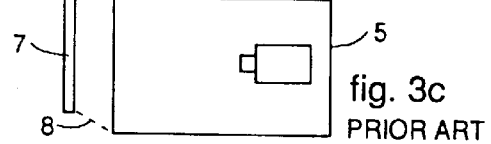
fig. 3a PRIOR ART
fig. 3b PRIOR ART
fig. 3c PRIOR ART
fig. 3d PRIOR ART

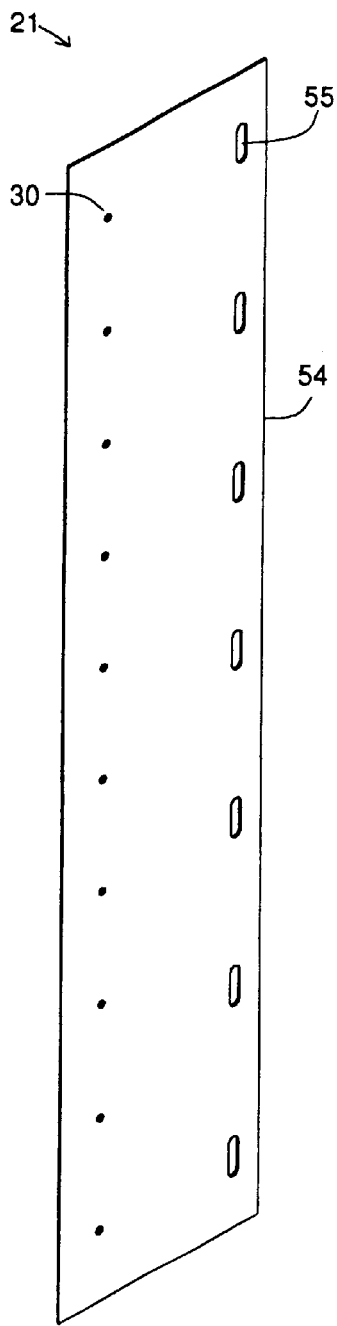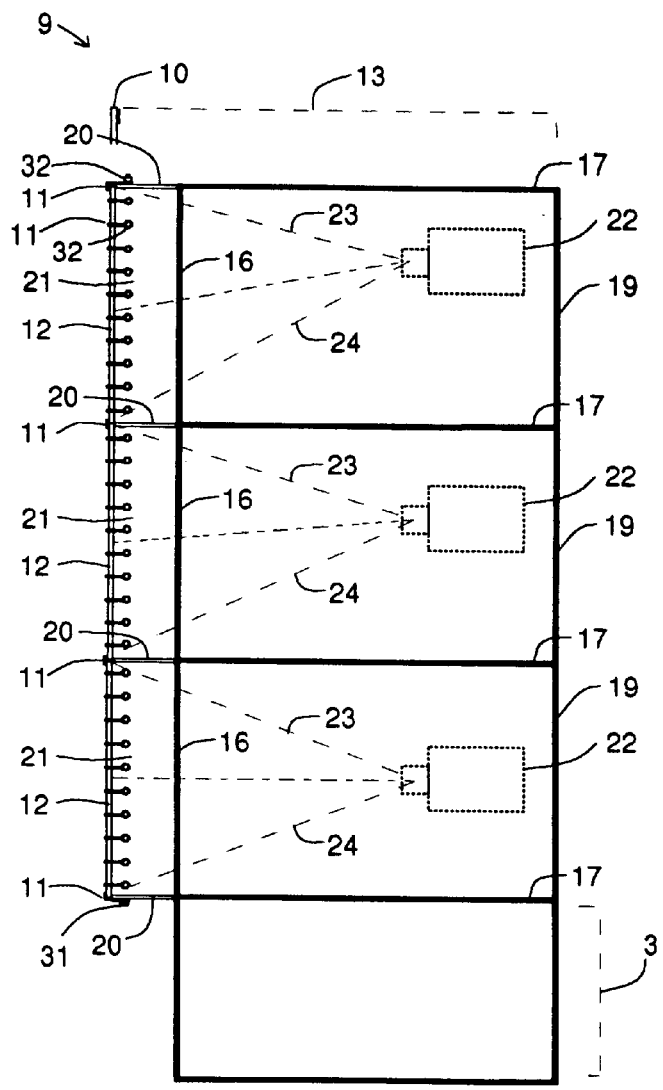
fig. 9
fig. 10

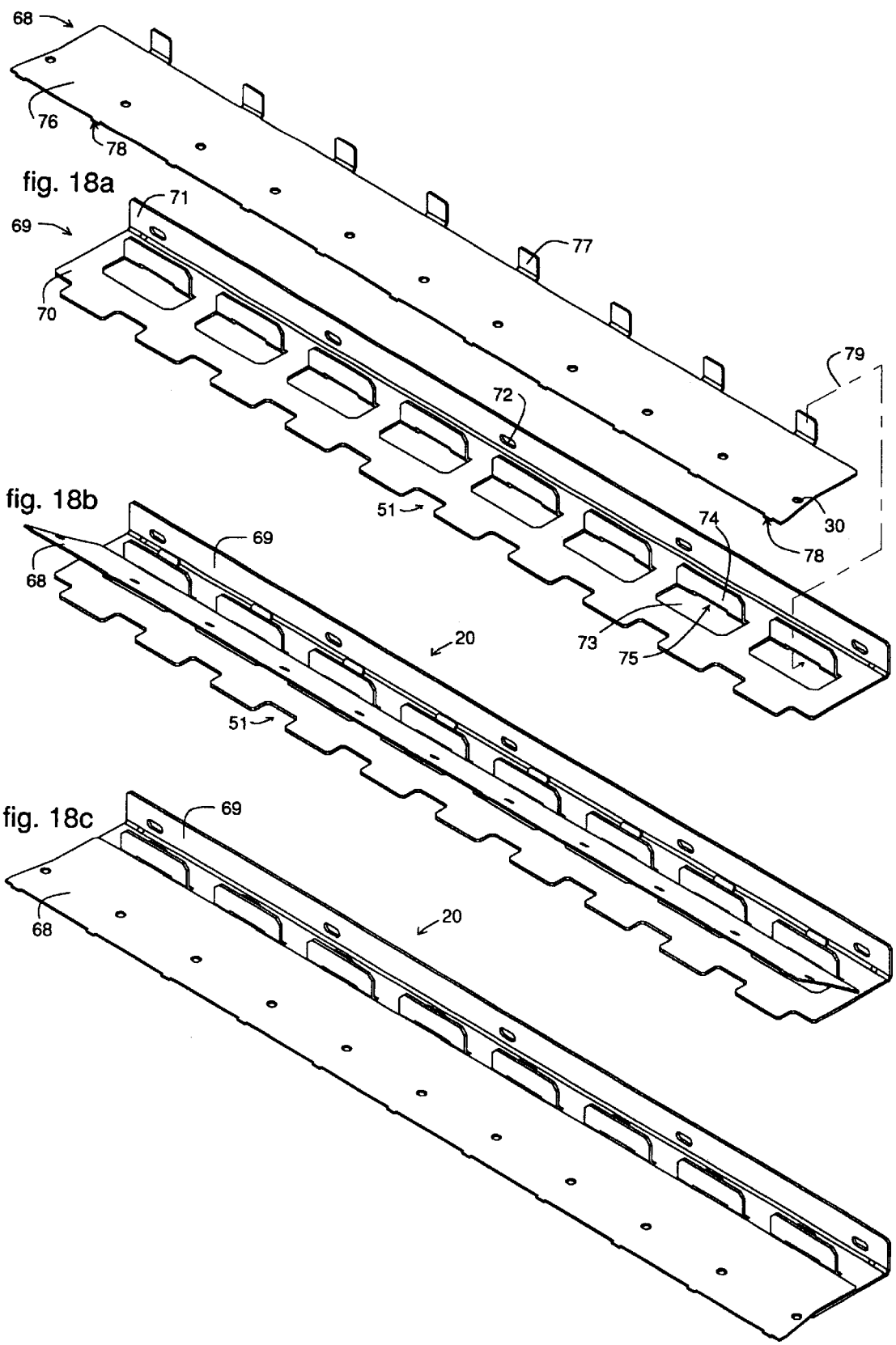

PROJECTION SCREEN FOR IMAGE REPRODUCTION DEVICES WHICH ARE POSITIONED NEXT TO AND/OR ABOVE ONE ANOTHER

This is a Continuation of: International Appln. No. PCT/BE98/00133 filed Sept. 9, 1998 which designated the U.S.

TECHNICAL FIELD

The present invention relates to a projection screen for image reproduction devices which comprise projectors and screens, an image being projected onto the rear side of a screen with the aid of a projector. The field of application is that of multi-screen displays.

In the case of a multi-screen display of this nature, the viewer is situated in front of the screens, which are positioned next to and/or above one another, optionally at an angle, so that they form an image surface onto which an image, optionally composed of a plurality of subimages, can be projected. A subimage may cover one or more screens of the image surface and may occur at any desired location on the image surface. These subimages may be projected dependently or independently. The images may be moving or still.

In the case of multi-screen displays, there are the same number of (at least two) projectors as screens for projecting images onto the screens. As a result of their layout, the screens form a surface in the space which lies between the projectors and the viewer. There is a joint or seam where the screens which are positioned next to and/or above one another contact one another. With existing multi-screen displays, it is constantly being sought to limit the visibility of the seams between the assembled screens to a minimum for the viewer and to keep them at a minimum level over the course of time.

BACKGROUND ART

In practice, multi-screen displays are known in which a larger screen is assembled from a plurality of smaller screens or screen panels.

FIG. 1 shows a front view of a multi-screen display 1 according to the prior art, which is a combination of M screens 2 in the width direction and N screens 2 in the height direction, optionally with a stand 3 at the bottom. FIG. 2 shows a side view of the same multi-screen display 1, showing screens 2, supporting structures 5 (one per screen or one for a plurality of, or for all the screens together) and projectors 6. In FIGS. 1 and 2, some of the seams 4 between the separate screens 2 are indicated.

A multi-screen display may be composed of a number of identical basic units which are stacked on top of and/or next to one another as modules and are optionally attached to one another in addition. A basic unit of this nature is composed of a partially or completely light-screening, supporting structure, a screen which is mounted either fixedly or removably on the supporting structure or is mounted in front of or behind the arrangement of the multi-screen display, and a projector which is prefitted, optionally extendibly, entirely or partially in the supporting structure or is mounted in front of or behind the arrangement of the multi-screen display. Assembly by means of basic units requires a stable, perfectly flat supporting surface if, during installation, it is desired to obtain and retain an optimum connection between the basic units. Changing climatological conditions, such as temperature and relative atmospheric humidity, may alter the distance between the basic units and have an adverse effect on the connection between them.

FIGS. 3a, 3b, 3c and 3d together illustrate how, in the case of three combinations, one above the other, of a screen 7 and a supporting structure 5, differences in expansion cause the dimensions of the screens 7 to change with respect to the dimensions of the supporting structures 5 under the influence of climatological conditions. The screens 7 and the supporting structures 5 are illustrated separately from one another and are joined by means of auxiliary lines 8 in order to make the differences between their dimensions clear. FIG. 3a shows three correctly installed, adjacent screens 7 and supporting structures 5 under the nominal climatological conditions. In comparison to FIG. 3a, FIG. 3b and FIG. 3c show the screens 7 once they have become smaller with respect to the supporting structures 5 as a result of climatological conditions. In FIG. 3b, the three screens 7 are not attached any more to one another. Consequently, therefore, the seam 4 between two screens 7 becomes larger. In FIG. 3c, the three screens 7 are still attached to one another; the total screen surface area has become smaller while the seams 4 have in principle not changed. In FIG. 3d, by comparison with FIG. 3a the screens 7 have become larger with respect to the supporting structures 5 as a result of climatological conditions. The total screen surface area has become larger and the seams 4 have in principle not changed. Similar changes to those illustrated in FIG. 3 for screens which are situated above one another may also arise in the case of screens which are situated next to one another.

The effect of climatological conditions is important not only for multi-screen displays assembled from basic units but also for the multi-screen displays from the prior art which are described below and in which larger screens are obtained by joining together smaller screens, for example by adhesive bonding.

The basic units of the prior art which have been described above often have a frame around the screen, which frame holds this screen flat, often also serves to attach the screen to the housing of the basic unit and protects the edges of the screen from damage. This frame prevents an image from being projected all the way as far as the outer edge of the front side of the basic unit and makes the visual joint or seam between the basic units larger. EP-0 650 295 and EP-0 523 427 describe basic units of this nature and the assembly of a plurality of basic units of this nature to form a multi-screen display. A solution for allowing images to be projected right up to the edge of the front side of the basic unit is described in WO 95/28664 and consists in a special treatment of the outer edges of the screen and a special attachment of the said screen to a supporting structure, so that the light from the projector is able to reach the front edges of the screen—which are also the front edges of the basic unit—without being impeded. In principle, it is possible to achieve a perfect connection between screens of basic units at a specific temperature. However, the edges of a basic unit of this nature are fragile during transportation and the other drawbacks which are inherent to the assembly of basic units continue to exist.

Another solution is to adhesively bond together relatively small optical screens to form larger screens. Adhesively-bonded larger screens of this nature cannot be produced at the location where the projection screen is to be installed, but rather can be produced only at the premises of the constructor, following which they have to be transported in very robust and large packaging. In order to prevent damage and contamination to the screens during attachment to a supporting structure, installation has to take place with the greatest possible care.

U.S. Pat. Nos. 5,011,277 and 5,085,495 disclose projection screens comprising one or more horizontally arranged basic units comprising multiple screen panels which are arranged one above the other. The screen panels, a single front sheet, a single re-inforcing sheet and a support body are pulled together by means of wire and coil spring combinations. The horizontal seams between contacting screen panels arranged above each other are minimised. The vertical seams between screen panels of horizontally neighboring basic units are however not sufficiently minimised. Attaching basic units of this nature to one another not only has the abovementioned drawbacks which are inherent to the use of relatively large single screens or adhesively-bonded larger screens, but also drawbacks which are inherent to modular multi-screen displays assembled from identical basic units, such as the need for a flat and stable base and the fact that the connection between the basic units is dependent on temperature and humidity.

The abovementioned multi-screen displays which are known from the prior art are difficult to transport owing to their large dimensions and fragility and for installation often require lifting mechanisms, a large space around them and a number of qualified fitters. During installation, it is difficult or impossible to compensate for production tolerances in the dimensions of the components to be assembled and it is impossible to guarantee an optimum connection between the components to be assembled.

JP-08152677 describes a multi-screen display with a projection screen, consisting of a supporting frame body and a screen. The screen comprises several screen panels arrayed and arranged up and down and left and right, and horizontal and vertical light shielding plates. The screen panels and the light shielding plates have matching holes through which fit wires to stitch them together. The front edge of a light shielding plate is stitched to two mutually contacting screen panels on which it abuts, by means of wires, the two ends of which are fixed to the supporting frame body via, amongst others, two springs. The visibility of the so formed seams between mutually contacting screen panels is minimised. The screen hangs up at the top of the supporting frame body in a horizontal slider, and is pulled back to the supporting frame body by means of the springs which attach the stitching wires. At the bottom and on both sides, the screen can slide against the supporting frame body.

In order to obtain that the front edge of a light shielding plate remains close in touch which the mutually contacting screen panels with which it is stitched to form a seam, even in circumstances of expansion/shrinkage of screen panels caused by varying climatological circumstances, a light shielding plate should deform so that the seam can move. Such a movement of seams is however limited in at least two ways:

A light shielding plate is immovably fixed to the supporting frame body. Therefore, in the longitudinal direction said shielding plate cannot really move, it can only expand a little, which limits the movement of the corresponding seam attached to it. However, when the light shielding plate can bends, it is possible for the seam to move in a direction perpendicular to the longitudinal direction of the corresponding shielding plate.

At the short extremities of the light shielding plates, however, the perpendicular movement of the seam is limited by the light shielding plates which are attached at right angles with respect to the considered shielding plate, which light shielding plates cannot move in their longitudinal direction, as explained hereinabove. Therefore, at the short extremities of the light shielding plates, it is impossible for the seam to move in a direction perpendicular to the longitudinal direction of the corresponding shielding plate.

For above reasons, the light shielding plates can not deform enough to let the seams move in case of a non-negligible expansion/shrink of a screen. With a typical screen panel expansion/shrink of 0.7 mm per m per 10 degrees Celsius, screens of e.g. 10 m diagonal width can show seam movements of 10 mm. By consequence of this, in case of a non-negligible expansion/shrink of a screen, the screen panels and the corresponding seams have to move with reference to the edges of the light screening plates. If the stitches do not permit this, the screen panels will deform. If the stitching wires permit a move of the screen panels with regard to the edges of the attached light screening plates, e.g. because of looser tensioned stitching wires, minimised seams between contacting screen panels can not be guaranteed. For above-mentioned reasons, the solution of JP-08152677 is not sufficient to build larger projection screens.

Other disadvantages of the multi-screen display described in JP-08152677 are that not all the screen panels can have the same dimensions, and that the mounting of the wires is complicated and time consuming, both disadvantages complicating the mounting and replacement of screen panels.

DISCLOSURE OF INVENTION

The object of the present invention is to eliminate the abovementioned drawbacks.

The present invention relates to a projection screen for image reproduction devices, comprising a screen which is assembled from a plurality of, by preference identical, screen panels, a plurality of "light screening" attachment plates and a supporting structure. The screen panels are provided at the edges with small holes in which joining wires are arranged, by means of which mutually contacting screen panels are drawn towards one another and by means of which screen panels are fixed to the attachment plates. The attachment plates thus present a part to which the screen panels are joined. Also the attachment plates and the supporting structure are joined together.

Of at least some of the attachment plates, at least the part to which screen panels are joined can make a guided longitudinal movement and can bend, or can hinge on to the supporting structure or another part of the same attachment plate which has an immovable join to the said supporting structure.

By a longitudinal move of an item is meant a move in the direction of the longest edge of the item. By a movable join between an attachment plate and the supporting structure is by preference meant a longitudinal move of the attachment plate with respect to the supporting structure and/or a hinging on to each other of the said attachment plate and the supporting structure. By hinging of a first item on to a second item is meant that the first item and the second item form a hinge, whether or not physical axes of a hinge are present.

The attachment plates are preferably horizontal and vertical attachment plates, which are provided with small holes for fixing the joining wire. A combination of deformable and non-deformable attachment plates may be used. By deforming of an attachment plate is by preference meant bending and/or a longitudinal move of two parts of the attachment plate with respect to one another and/or a hinging of two parts of the attachment plate to one another.

The screen panels are preferably optical panels, such as a Fresnel lens, a lenticular or a combination of the two and have a perfectly rectilinear edge. They may comprise a plurality of layers, of which at least one layer is attached to the attachment plates with the aid of joining wires.

In order to draw the screen panels towards one another and to position them with respect to one another, and in order to fix these screen panels to and position them with respect to the attachment plates, use is preferably made of rigid joining wires which are U-shaped and are made from metal or plastic.

The seams between the screen panels which have been drawn towards one another are minimal, with a size of less than half a millimeter. Drawing the panels together by means of joining wires ensures that the seams between the screens are always, and remain, minimal, in spite of manufacturing tolerances and under changing climatological conditions, such as temperature and relative atmospheric humidity. Any differences in expansion/shrink between the screen panels, on the one hand, and the supporting structure of the projection screen, on the other hand, are absorbed by the fact that the attachment plates which join together the screen and the supporting structure are deformable and/or have a movable join to the supporting structure (13), and the fact that the joining wires can be deformed to a limited extent in order to keep the join between the screen panels optimal. As a result, the screen can move with respect to the supporting structure, within certain limits, in such a way that the seams remain minimal.

The attachment plates have a number of functions, such as, inter alia, attaching and positioning screen panels, bearing the weight of one or more screen panels, deforming in order to allow movement of the screen, and providing separation between light emanating from projectors which are positioned directly next to or above one another.

The horizontal attachment plates are preferably assembled from a plurality of plates which are attached to one another and one of which is attached to the supporting structure and to one of which the screen panels are attached. The horizontal attachment plate preferably has a greater rigidity in the downwards direction than in the upwards direction, in order to be able to bear the weight of one or more screen panels.

The vertical attachment plates preferably consist of a single plate which can be attached to the supporting structure and to which screen panels can be fixed, or is composed of a plurality of plates which are joined to one another and one of which is attached to the supporting structure and to one of which the screen panels are fixed. In order to be able to absorb the movement of the screen and/or the screen panels, the vertical attachment plate preferably bends or hinges to the left or to the right and is able to slide up and down, together with the screen panels connected thereto, with respect to the supporting structure. An attachment plate to which the screen panels are fixed is preferably made from a non-transparent, matt and black plastic which has approximately the same coefficient of expansion as that of the material used for the screen panels and is preferably provided with small holes for fixing the joining wires of the screen panels using nuts and bolts.

BRIEF DESCRIPTION OF DRAWINGS

The invention will be described below with reference to the figures, in which

FIG. 1 is a front view of a multi-screen display as is known in the prior art,

FIG. 2 is a view in the direction of II–II' in FIG. 1,

FIG. 3 illustrates the influence of climatological conditions on the dimensions of screens and supporting structures, the dimensions of screen and supporting structure being nominal in FIG. 3a, while in FIG. 3b the screen, of which the constituent picture screens are not attached to one another, has expanded to a lesser extent than the supporting structure, while in FIG. 3c the screen, of which the constituent picture screens are attached to one another, has expanded to a lesser extent than the supporting structure, while in FIG. 3d the screen has expanded more than the supporting structure, FIG. 9 is a perspective view of a vertical attachment plate of the first embodiment, FIG. 10 is a section through the basic structure of a multi-screen display in the direction of X–X' in FIG. 4, FIGS. 18a, 18b and 18c are a three-dimensional, exploded illustration of a horizontal attachment plate of the second embodiment.

In the figures, an identical or similar component is assigned an identical reference numeral.

MODES FOR CARRYING OUT THE INVENTION

The present invention is now further described by means of two preferred embodiments.

Figure 4:
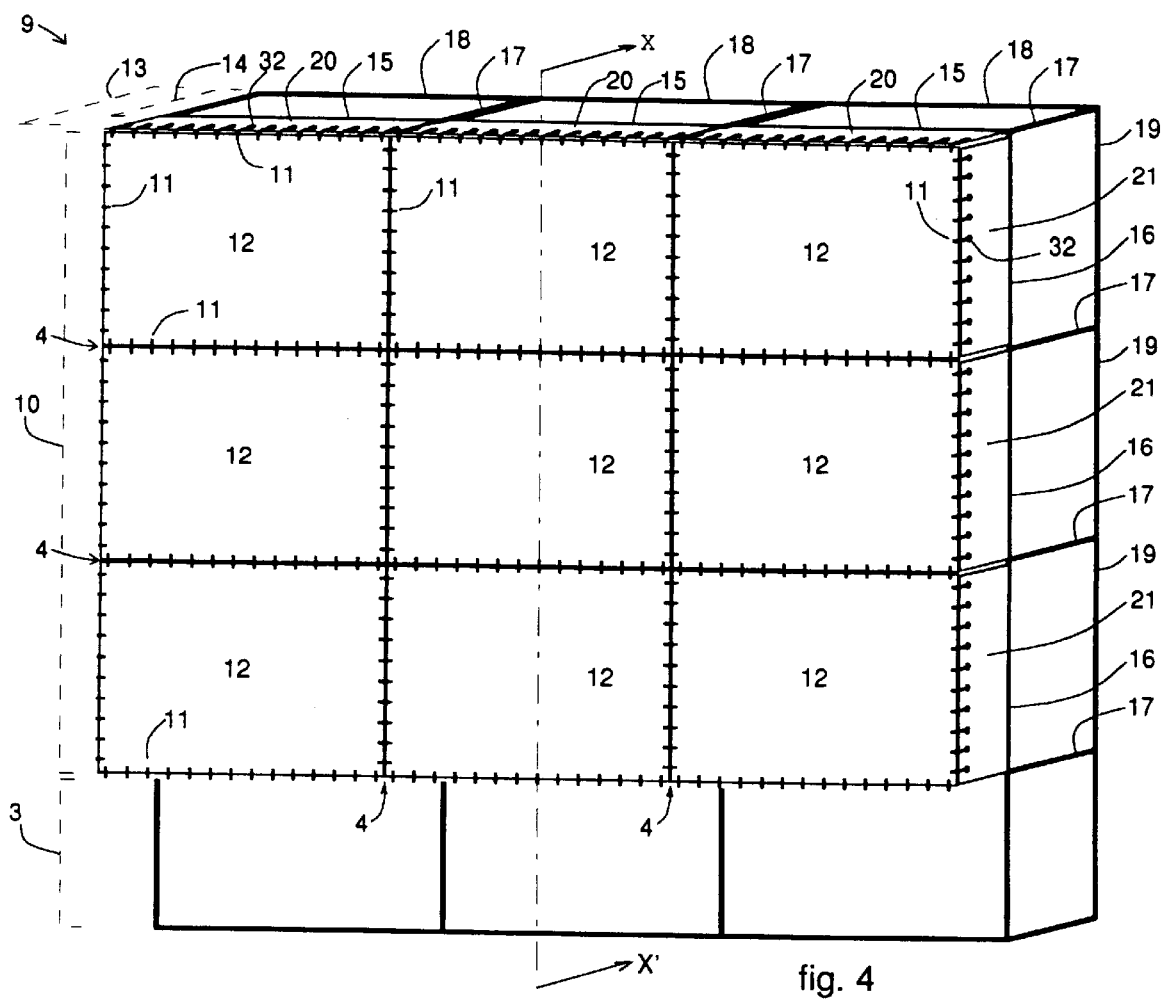
FIG. 4 shows the basic structure of a multi-screen display according to the invention.

The first and second preferred embodiments of the present invention will first be partly described together with reference to FIG. 4 and FIG. 10.

FIG. 4 shows a perspective view of a projection screen 9. The projection screen 9 comprises a screen 10 and a supporting structure 13. The screen 10 is assembled from nine screen panels 12 which are fixed to one another by joining wires 11 and are positioned in a 3×3 configuration. The supporting structure 13 is a chassis frame 14 composed of horizontal, vertical and lateral aluminium profile sections 15, 16, 17 with horizontal and vertical attachment plates 20, 21 fixed thereto for attaching the screen panels 12. The same number of projectors are mounted in the supporting structure 13 as there are screen panels 12. At the bottom, there is a stand 3 which places the projection screen 9 at a suitable height for the viewer.

FIG. 10 shows a section in the direction of X–X' in FIG. 4. It is possible to see three screen panels 12 one above the other, vertical profile sections 16 and lateral profile sections 17 of the supporting structure 13, four horizontal attachment plates 20 and three vertical attachment plates 21. Also indicated is the position of projectors 22. The projectors 22 shown are preferably horizontally disposed LCD projectors. The upper limit 23 and lower limit 24 of the beam of rays from each projector 22 is also indicated. In order to optimize the uniformity of the brightness of the total projected image towards the viewer, the upper projectors 22 are disposed out-of-axis.

First Preferred Embodiment

A single extruded section is used for the horizontal and vertical profile sections 15, 16; the horizontal profile sections 15 are longer than the vertical profile sections 16.

Figure 12:
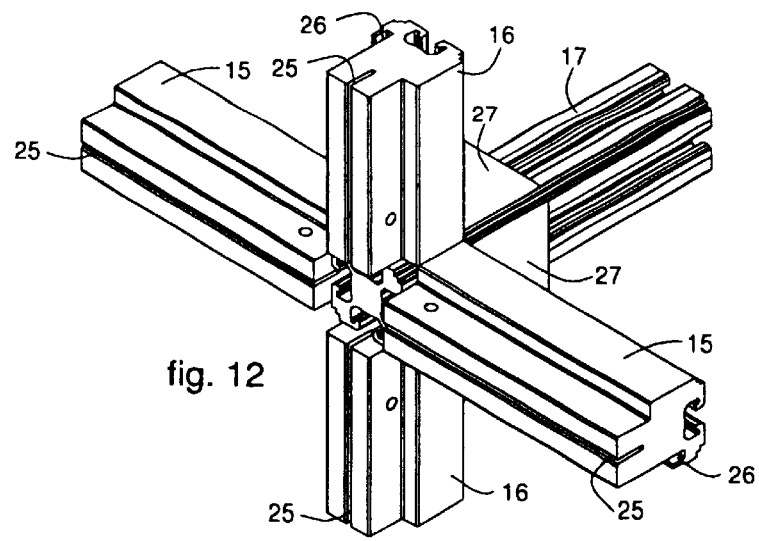
FIG. 12 is, of the first embodiment, a perspective view of the intersection between horizontal, vertical and lateral profile sections which are connected by means of attachment elements.

FIG. 12 shows the intersection between two horizontal profile sections 15, two vertical profile sections 16 and a lateral profile section 17. The horizontal and vertical profile sections 15, 16 present two longitudinal slots on the front side, namely a central slot 25 for the attachment of a vertical attachment plate 21 and a lateral slot 26 for the attachment of a horizontal attachment plate 20. A T-slot is provided on the rear side of the horizontal and vertical profile sections 15, 16 for fixing these profile sections 15, 16 to a lateral profile section 17 via attachment elements 27 and using coach bolts and nuts as described in BE-9601054. This lateral profile section 17 differs from the horizontal and vertical profile sections 15, 16 in that it is substantially square in cross-section, and that it has at least one slot in the longitudinal direction on each of the four sides. At the location where horizontal and vertical profile sections come together at an intersection as shown in FIG. 12 or at an edge of the projection screen 9, the horizontal and vertical profile sections 15, 16 are all fixed to the same lateral profile section 17.

The stand 3—which may or may not be present—may be composed in the same way and with the same profile sections 15, 16, 17, but is not described in further detail here.

A screen panel 12 is a flat, rectangular optical panel without a frame or any other form of border, and consists of a single layer or of a plurality of layers which are positioned one in front of the other, one layer being, for example, a Fresnel lens or a lenticular. The possible dimensions and thickness of a screen panel 12 depend on the desired total screen dimensions and optical properties of the screen 10. A screen panel 12 may have, for example, a width of 1016 mm and a height of 762 mm; the width/height ratio is therefore 4/3. The thickness of a screen panel 12 is, e.g., approximately 5 mm.

The horizontal and vertical edges of a screen panel 12 are as far as possible rectilinear and are suitably finished, using existing techniques such as sawing, milling, laser cutting or water-jet cutting.

In order to attach together mutually contacting screen panels 12 according to the present invention, small holes 28 are made in a screen panel 12, close to the edges, using existing techniques such as e.g. drilling and/or milling. In the embodiment described, the holes 28 have a diameter of e.g. 0.9 mm and the centre of one hole 28 lies at a distance of 1.4 mm from the closest edge of the screen panel 12. The distance between two adjacent holes 28 on the same edge is for example 100 mm.

All the screen panels 12 have the holes 28 at the same positions. In order to be able to attach the screen panels 12 to one another using joining wires 11 according to the present invention, the positions of the various holes 28 along a similar (horizontal or vertical) edge are all at the same positions and are distributed symmetrically with respect to the centre of the edge in question. Therefore, when installed correctly, for two mutually contacting screen panels 12 there is always, for each hole 28 on one screen panel 12, a corresponding hole 28 on the other screen panel 12, symmetrically with respect to the seam between the two screen panels 12.

Figure 5:
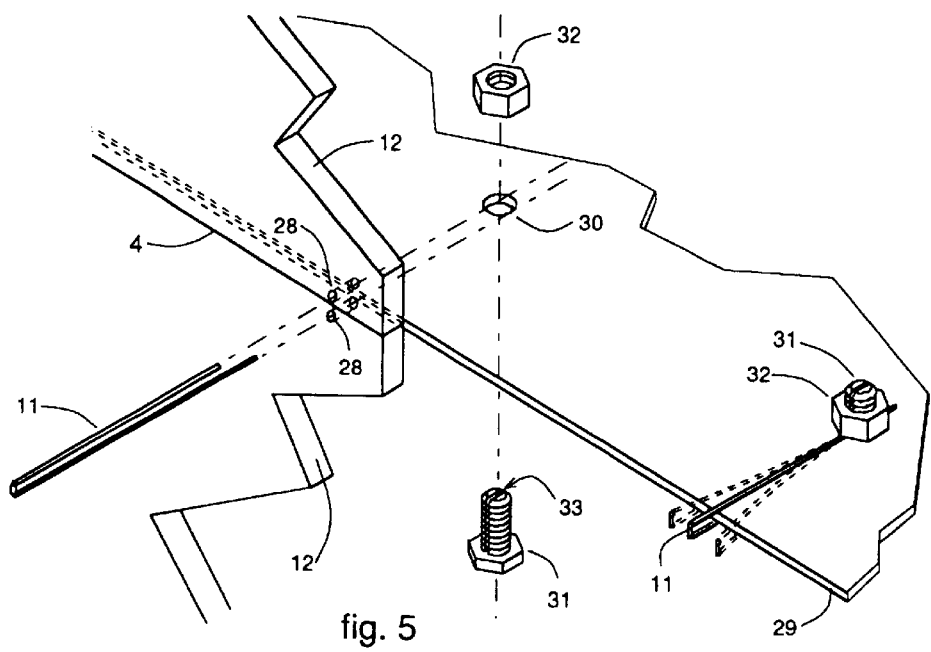
FIG. 5 is a perspective view of the connection of two screen panels to one another and to an attachment plate by means of a joining wire.

In order to join together the screen panels 12 according to the present invention, a rigid, folded U-shaped metal joining wire 11 is used, as illustrated in FIG. 5, comprising two limbs and a back. Preferably, the limbs of the joining wire are not of equal length, in order to facilitate inserting them into two corresponding holes 28 in two screen panels 12. The diameter of the metal wire used is e.g. 0.8 mm, the distance between the two limbs is 2 mm, the shorter limb is 56 mm long and the longer limb is 66 mm long.

In order to attach together two mutually contacting screen panels 12, a joining wire 11 is inserted into each pair of corresponding holes 28 at the seam between the two screen panels 12, with one limb through one hole 28 and the other limb through the corresponding hole 28 in the adjoining screen panel 12. The joining wire 11 is then pushed fully through the holes 28 until the back of the joining wire 11 comes into contact with the screen panels 12, after which it is pulled at the rear side and fixed in such a way that the screen panels 12 adjoin one another as well as possible.

The U-shaped joining wires 11, during installation, are always fixed in the same way, as illustrated in FIG. 5. An attachment plate 29, as will be described in more detail below but for the sake of simplicity is illustrated in FIG. 5 as a simple plate, is at right-angles to and in contact with two mutually contacting screen panels 12. At every position where attachment can be made by means of a joining wire 11, the attachment plate 29 has a hole 30 which corresponds to the two holes 28 in the screen panels 12 into which a joining wire 11 fits. Via a bolt 31 and a nut 32, introduced into a hole 30 of this nature, the two limbs of a positioned joining wire 11 are attached to the attachment plate 29, one limb on one side of the attachment plate 29 and the other limb on the other side. As a result, the joining wire 11 also positions the attachment plate 29 with respect to the seam 4 between the two screen panels 12. To this end, a slot 33 is formed in the thread section of the bolt 31. In order to fix a joining wire 11, a bolt 31 is inserted through a hole 30 in the attachment plate 29, the thread section of the bolt 31 sliding over the two limbs of the joining wire 11, after which the nut 32 is screwed onto the bolt 31. As the nut 32 is tightened, the two limbs of the joining wire 11 are pressed against the attachment plate 29. FIG. 5 shows that a fixed joining wire 11 can bend in the plane of the attachment plate 29, to permit a move of the joined screen panels 12 with reference to the attachment plate 29, when the screen panels 12 and the attachment plate 29 do expand/shrink differently.

According to the present invention, the screen panels 12 are not directly fixed to the chassis frame 14, but rather are fixed via horizontal and vertical attachment plates 20, 21. Both types of attachment plates 20, 21 are described in more detail below, as is the way in which they are fixed to the chassis frame 14.

Figure 6:
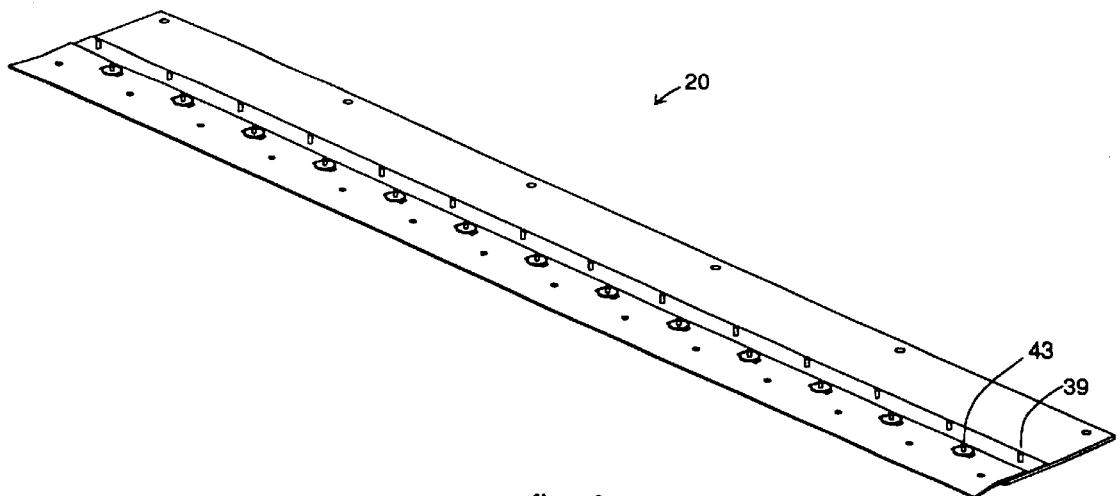
FIG. 6 is a perspective view of a horizontal attachment plate according to a first embodiment.
Figure 7:
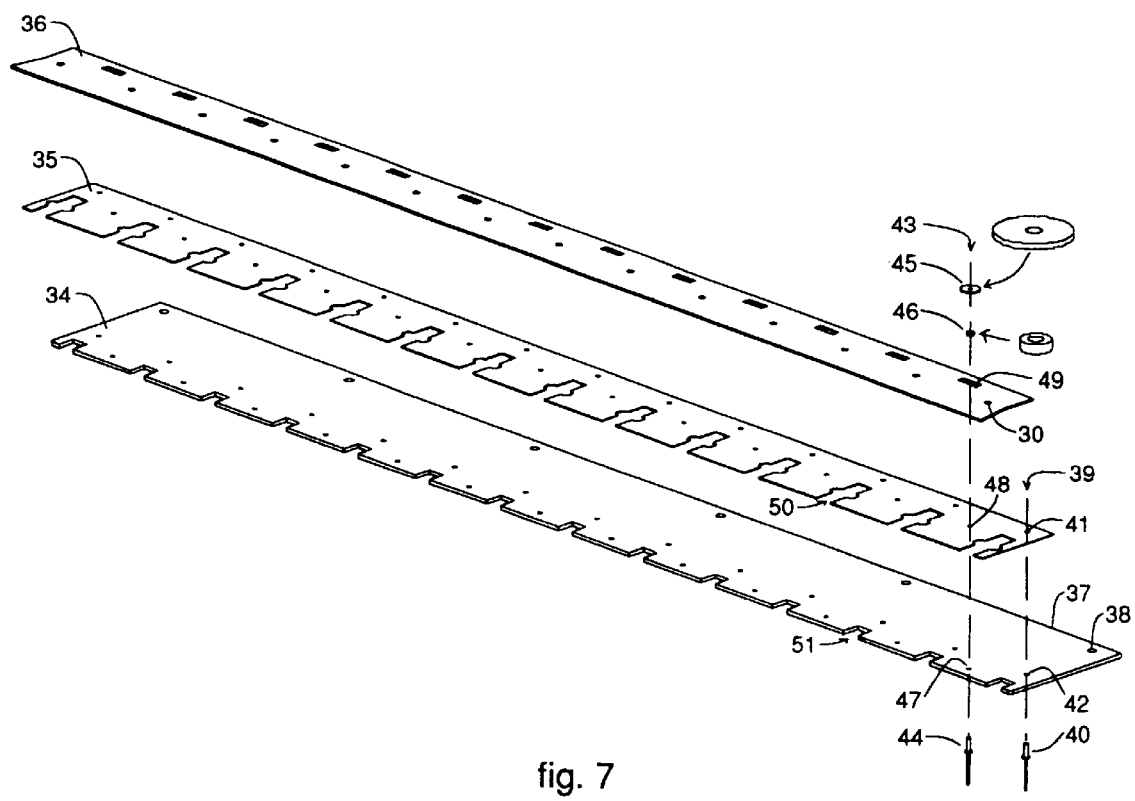
FIG. 7 is a three-dimensional, exploded illustration of a horizontal attachment plate of the embodiment represented in FIG. 6, FIGS. 8a and 8b are a side view of the attachment of two screen panels to one another and to a horizontal attachment plate and the attachment of the horizontal attachment plate to a horizontal profile section of the supporting structure, at an out-of-axis angle of the projector of 0° and 10°, respectively, in the first embodiment.

A horizontal attachment plate 20 as illustrated in FIG. 6 is composed of a plurality of parts which are fixed to one another. FIG. 7 is a spatially exploded drawing of a horizontal attachment plate 20, showing a relatively thick bottom metal plate 34, a relatively thin middle metal plate 35 and a top plastic plate 36.

The bottom metal plate 34, which for example has a thickness of 4 mm and is made from an aluminium alloy (AlMg3), fits, by means of the rear edge 37, into the lateral slot 26 in a horizontal profile section 15 of the above-described chassis frame 14 and can be fixed therein using a nut-and-bolt connection, for which a number of holes 38 are provided in this bottom metal plate 34.

The middle metal plate 35, which for example has a thickness of 1 mm and is preferably also made from an aluminium alloy (AlMg3), is attached to the bottom metal plate 34 inter alia by means of a number of pop-rivet joints 39 for which in each case one pop rivet 40 is used. To this end, a number of round holes 41 are provided in this middle metal plate and a number of corresponding holes 42 are provided in the bottom metal plate 34.

For reasons of light-screening properties and an approximately equal coefficient of expansion to that of the screen panels 12, the top plastic plate 36, which e.g. has a thickness of 2 mm, is made from black matt PMMA. The top plastic plate 36 is fixed to the combination of the bottom and middle metal plates 34, 35 using a series of pop-rivet joints 43, for which in each case one pop rivet 44, a washer 45 and a spacer sleeve 46 are used. These pop-rivet joints 43 thus hold the bottom metal plate 34 and middle metal plate 35 together in a second way. For this purpose, a number of holes 47 are provided in the bottom metal plate 34 and a number of holes 48 are provided in the middle metal plate 35. The slots 49 in the top plastic plate 36 ensure that this plastic plate 36 is able to move in the longitudinal direction, within limits defined by the length of these slots 49, with respect to the combination of the bottom and middle metal plates 34, 35.

In order to attach the screen panels 12 to a horizontal attachment plate 20, a number of round holes 30 are present in the top plastic plate 36, a number of corresponding cutouts 50 are present in the middle metal plate 35 and a number of corresponding cutouts 51 are present in the bottom metal plate 34.

Figure 8A:
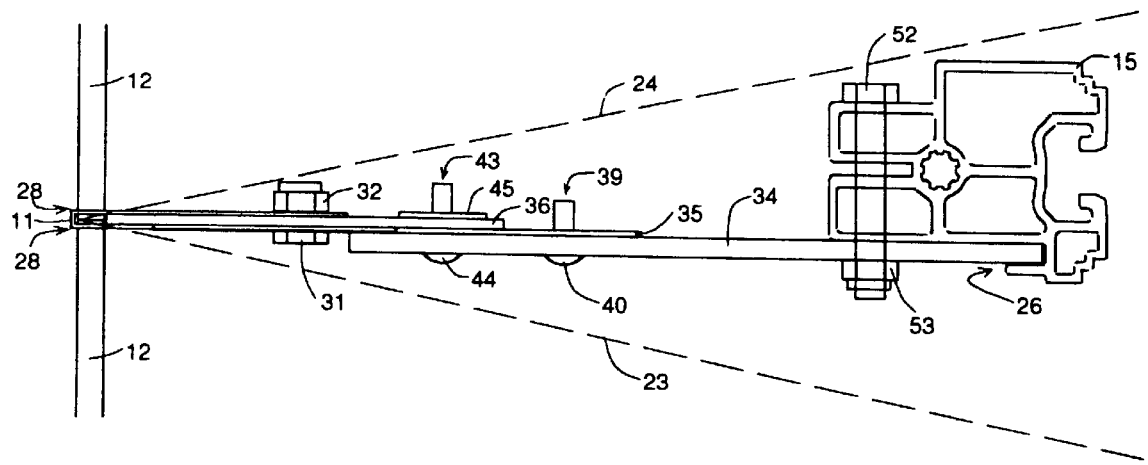

FIG. 8a shows a side view of a horizontal attachment plate 20, as fixed to a horizontal profile section 15 of a chassis frame 14 by way of a connection using a bolt 52 and a nut 53, and with two screen panels 12, which are positioned one above the other, attached thereto. The relatively thick bottom metal plate 34 of the horizontal attachment plate 20 fits into the lateral slot 26 in the horizontal profile section 15 of the chassis frame 14. The middle metal plate 35 is fixed, inter alia, to the bottom metal plate 34 of the horizontal attachment plate 20 by means of the pop rivet 40 of the pop-rivet joint 39. A second pop-rivet joint 43 also holds together the bottom and middle metal plates 34 and 35, and also the top plastic plate 36 by means of pop rivet 44 and washer 45 and a spacer sleeve 46 which cannot be seen in FIG. 8a. A joining wire 11 which is pushed into the screen panels 12 through corresponding openings 28 is fixed to the top plastic plate 36 by means of the bolt 31 and nut 32.

Figure 8B:
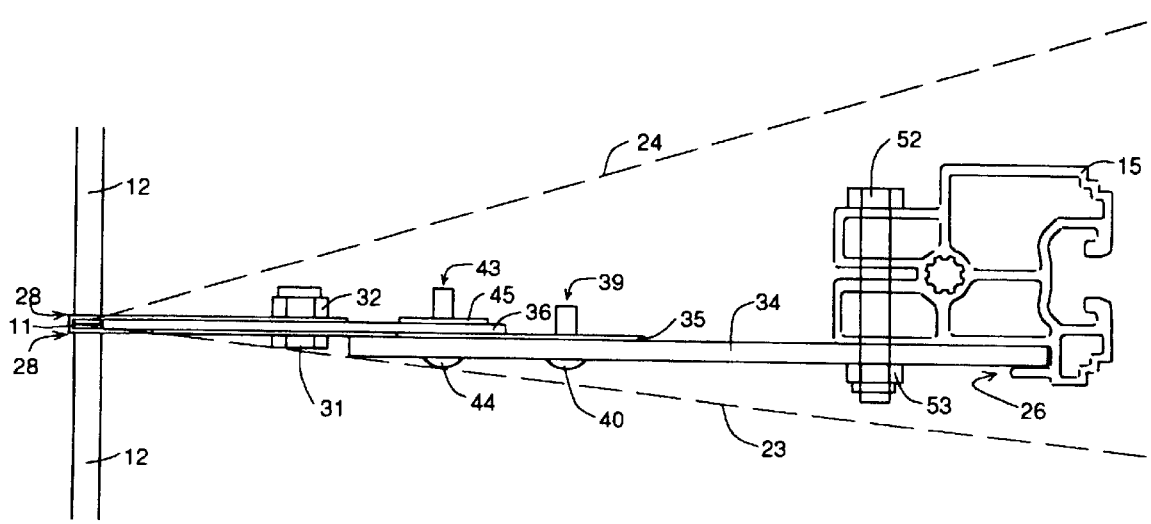

The dashed lines 23 and 24 in FIG. 8a indicate the limits of the light beams from projectors 22 where they are projecting in-axis. FIG. 8b shows the same assembly, but with the projectors 22 projecting onto the screen 10 at the maximum conventional out-of-axis angle of 10°. Together, FIGS. 8a and 8b show that, in order to keep the attachment components out of the light path from the projector 22 to the screen 10, they have to be short (such as the heads of the pop rivets 40 and 44 and the head of the bolt 31 which is also fitted on the underside). By positioning the horizontal attachment plate 20 not in a central slot 25 but in a lateral slot 26, it is possible to keep the attachment components out of the light path of the projector more easily in the case of a projector 22 which is operating out-of-axis.

An embodiment of a vertical attachment plate 21 is illustrated in FIG. 9. The vertical attachment plate 21 is of simple form and is not composed of several parts. It has a thickness of 2 mm and for reasons of light screening and coefficient of expansion is made from black, matt and opaque PMMA plastic. Its rear edge 54 fits into the central slot 25 in a vertical attachment plate 21 of the chassis frame 14. Two series of holes are arranged in the vertical attachment plate 21. A first aligned series of relatively small round holes 30 is provided for fixing the joining wires 11 to the screen panels 12 as described above. A second series of slots 55, which are also aligned, is provided in order to position the vertical attachment plate 21 in the central slot 25 on the front of a vertical profile section 16 of the chassis frame 14 by means of nut-and-bolt connections, so that the vertical attachment plate 21 can move vertically over a distance which is determined by the length of the slots 55.

Another embodiment of a vertical attachment plate 21 is an attachment plate 21 composed of several parts, as described below.

Figure 11:
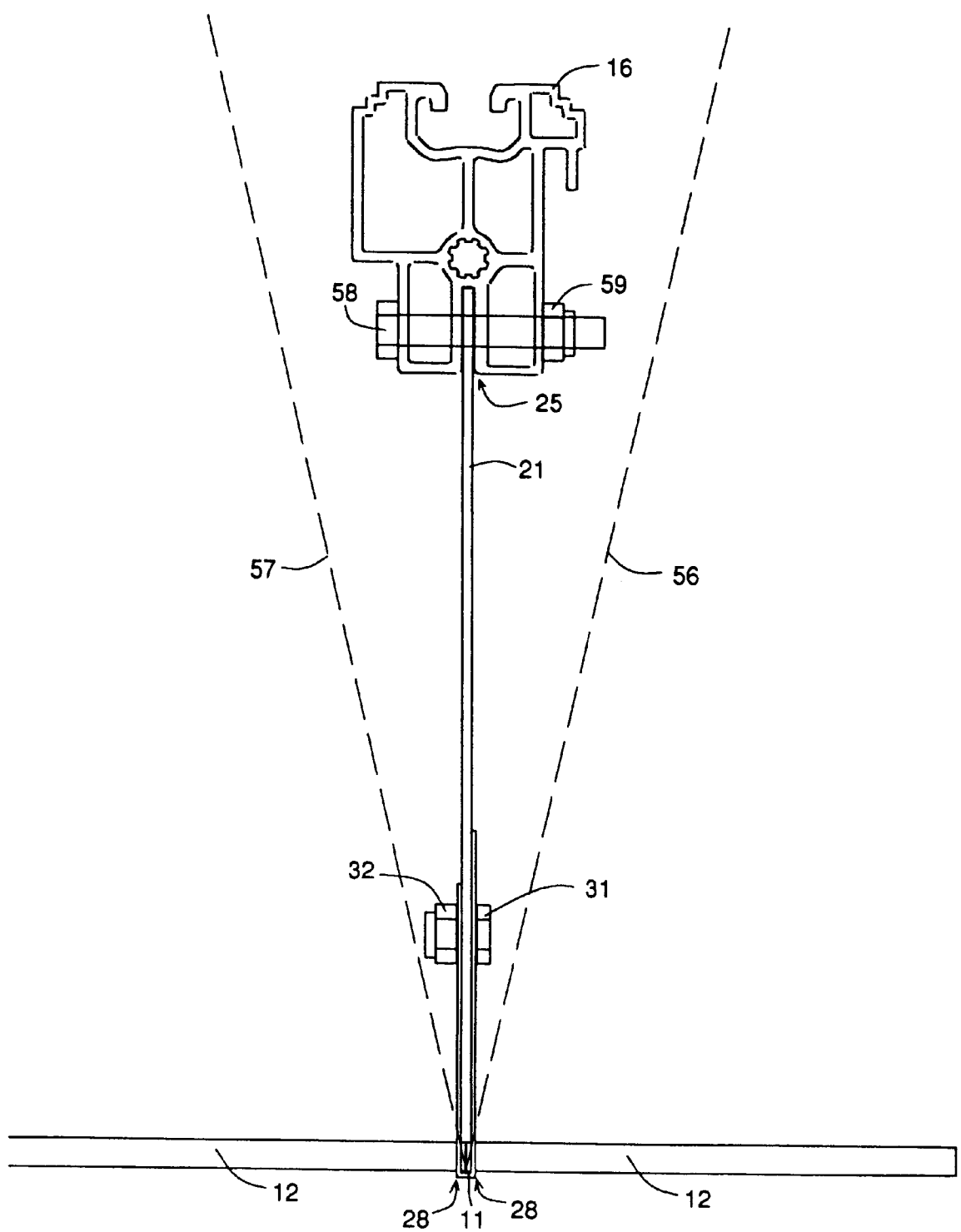
FIG. 11 is a top view of the attachment of two screen panels to one another and to a vertical attachment plate, and the attachment of the vertical attachment plate to a vertical profile section of the supporting structure, in the first embodiment.

FIG. 11 shows a top view of a vertical attachment plate 21 as fixed to a vertical profile section 16 of a chassis frame 14 by means of a connection comprising a bolt 58 and a nut 59, and with two mutually adjacent screen panels 12 attached thereto. A joining wire 11 which is pushed into the screen panels 12 through corresponding holes 28 is fixed to the vertical attachment plate 21 using a bolt 31 and a nut 32.

The dashed lines 56 and 57 in FIG. 11 indicate the limits of the light beams from mutually adjacent projectors 22. In order to keep the attachment components out of the light paths from the projectors 22 to the screen 10, these attachment components, i.e. the nut 30 and the bolt 31, must be as short as possible.

Figure 13:
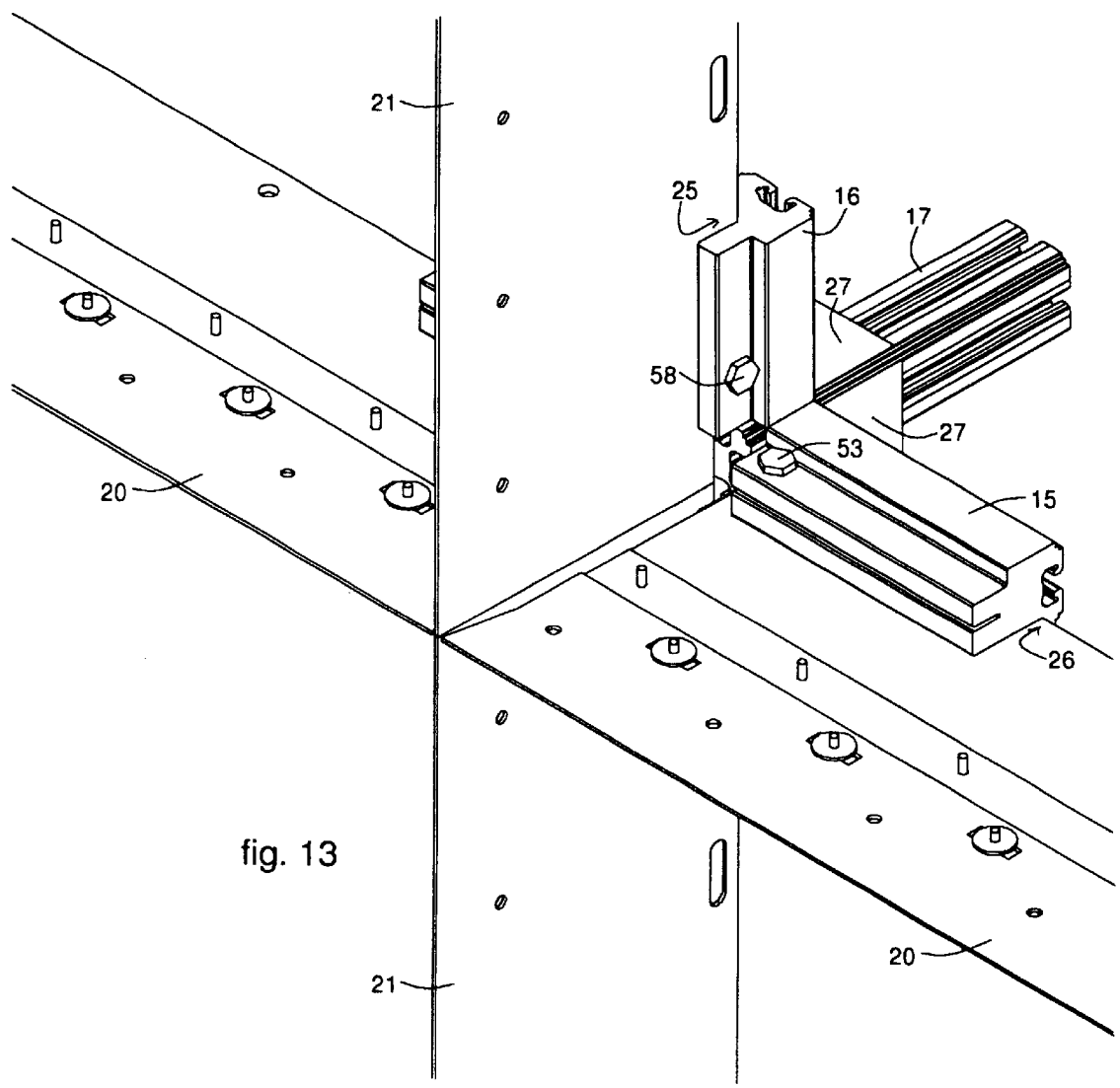
FIG. 13 is, of the first embodiment, a perspective view of the intersection between horizontal and vertical attachment plates which are attached to the supporting structure.

FIG. 13 illustrates, inter alia, a part of the supporting structure 13 of the projection screen 9, showing the intersection of the components of the said supporting structure 13 after assembly. The elements of the chassis frame 14 which are illustrated are part of a horizontal profile section 15, a vertical profile section 16 and a lateral profile section 17. The profile sections 15, 16, 17 of the chassis frame 14 are fixed to one another via attachment elements 27. A horizontal attachment plate 20 is pushed into the lateral slot 26 in the horizontal profile section 15 and fixed by means of bolts 52 and nuts 53. FIG. 13 shows one of these nut-and-bolt connections, but in reality there are a plurality of such connections over the entire length of the horizontal attachment plates 20 and horizontal profile sections 15 of the chassis frame 14. A vertical attachment plate 21 is pushed into the central slot 25 in the vertical profile section 16 and is fixed by means of bolts 58 and nuts 59, so that a vertical movement is possible, as described above. FIG. 13 shows one of these nut-and-bolt connections, but in reality there are a plurality of such connections over the entire length of the vertical attachment plates 21 and the vertical profile sections 16 of the chassis frame 14.

Figure 14:
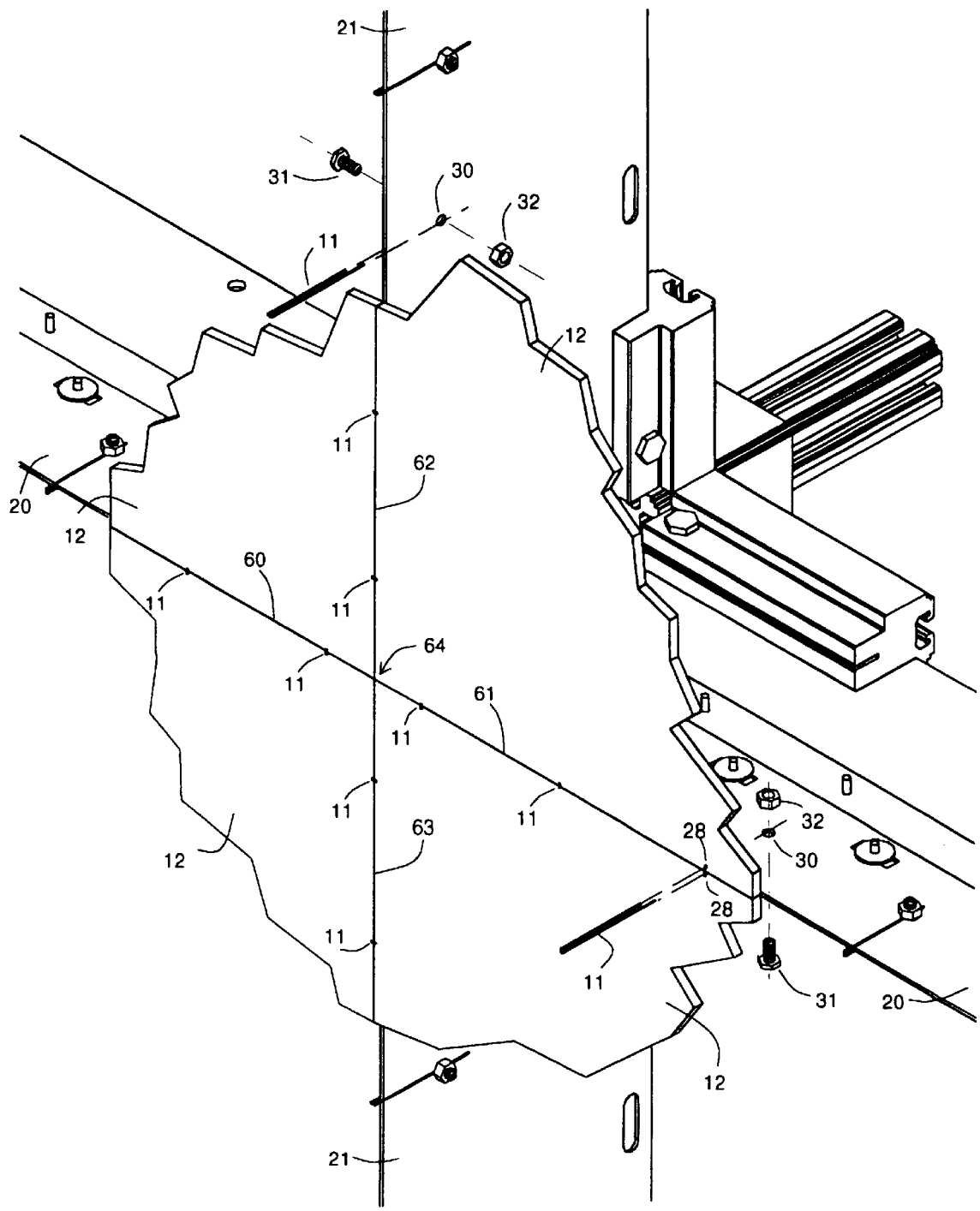
FIG. 14 is, of the first embodiment, a perspective view of four screen panels, which have been cut away and are attached to one another, at the intersection of horizontal and vertical attachment plates as illustrated in FIG. 13, FIGS. 15a, 15b and 15c illustrate how, in the first embodiment, the horizontal attachment plate is deformed and the vertical attachment plate is moved in the event of a vertical movement of the screen with respect to the supporting structure.

FIG. 14 shows a perspective illustration of part of the projection screen 9, showing the connection of four mutually contacting screen panels 12 which are connected to one another and to a supporting structure 13, at the intersection of profile sections 15, 16, 17 by means of attachment plates 20, 21, as also shown in FIG. 13. The four screen panels 12 are attached to one another and to the attachment plates 20, 21 by means of joining wires 11 as described above with reference to FIG. 5. FIG. 14 shows a spatially exploded view of two connections, of which one is to a horizontal attachment plate 20 and one is to a vertical attachment plate 21. As a result of using the present invention, the seams 60, 61, 62 and 63 between the screen panels 12 are of minimal width, and the horizontal seams 60 and 61, on the one hand, and the vertical seams 62 and 63, on the other hand, lie perfectly in line with one another, providing a perfect intersection at a point 64.

Figure 15A:
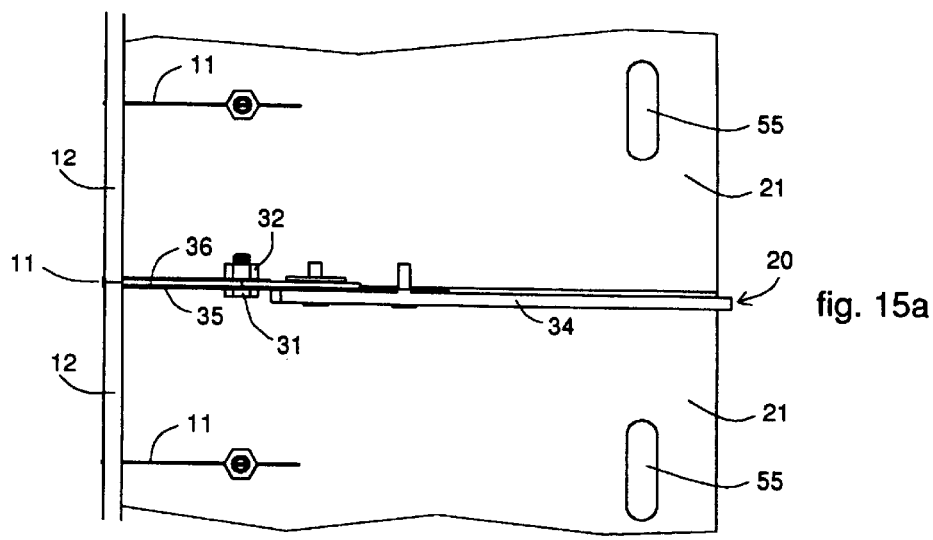
Figure 15B:
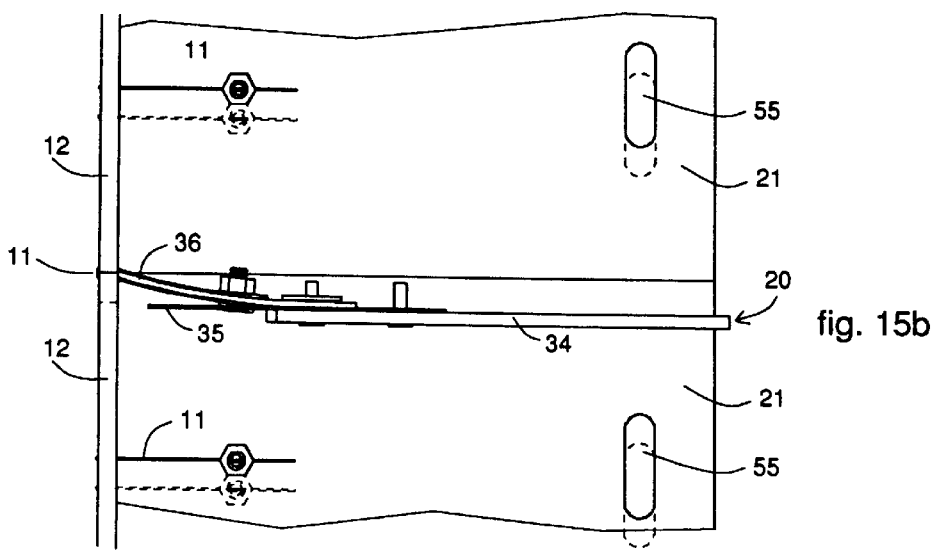
Figure 15C:
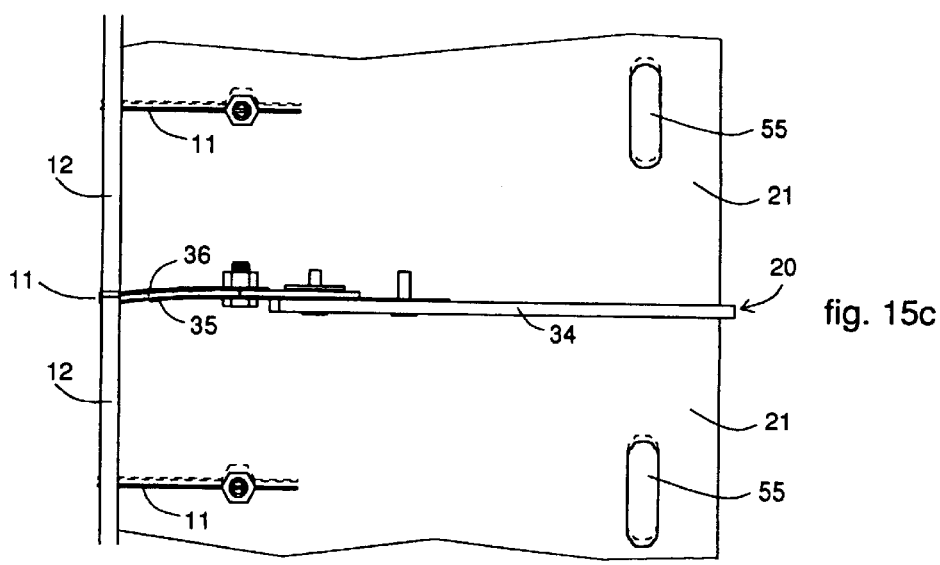

FIGS. 15a, 15b and 15c show a side view of two screen panels 12 which are situated one above the other and are held together by means of a joining wire 11 which is fixed to a horizontal attachment plate 20 by means of a bolt 31 and a nut 32. It is also possible to see two vertical attachment plates 21 which are positioned one above the other and each have a fixed joining wire 11 and a slot 55.

In FIG. 15a, the conditions are assumed to be optimal, i.e. correct installation at the nominal ambient temperature using components of nominal dimensions, so that the horizontal attachment plate 20 remains flat and only supports a screen panel 12 which stands above it.

This contrasts with FIG. 15b and FIG. 15c, in which the conditions are not optimal.

In FIG. 15b, the two screen panels 12 have been pulled upwards, the flexible top plastic plate 36 and the joining wire 11 bending upwards while still holding together the screen panels 12. The vertical attachment plates 21 have slid upwards.

In FIG. 15c, the two screen panels 12 have been pulled downwards, the flexible top plastic plate 36 and the joining wire 11 and, to a lesser extent, the middle metal plate 35 bending downwards but still holding the screen panels 12 together. The vertical attachment plates 21 have slid downwards.

Dashed lines in FIG. 15b and FIG. 15c indicate nominal positions of the components in order to illustrate the movement of the said components with respect to their nominal position as shown in FIG. 15a.

Figure 16A:
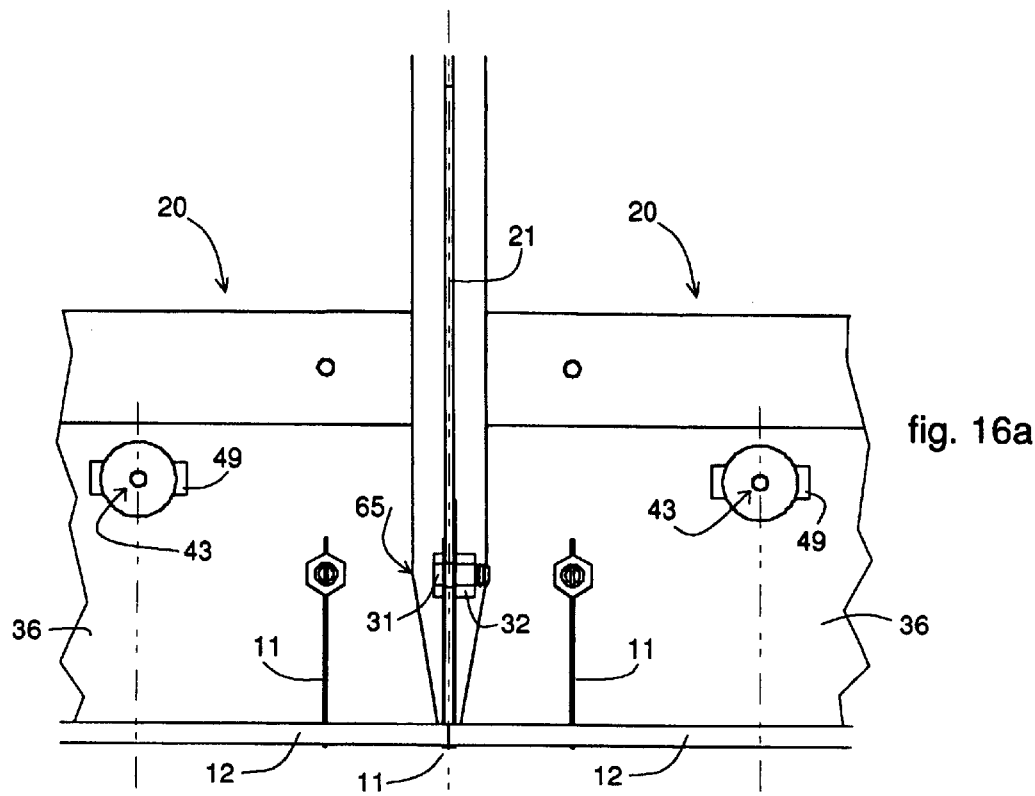
FIGS. 16a and 16b illustrate how, in the first embodiment, the vertical attachment plate bends and the top plastic plate of the horizontal attachment plate shifts in the event of a horizontal movement of the screen with respect to the supporting structure.
Figure 16B:
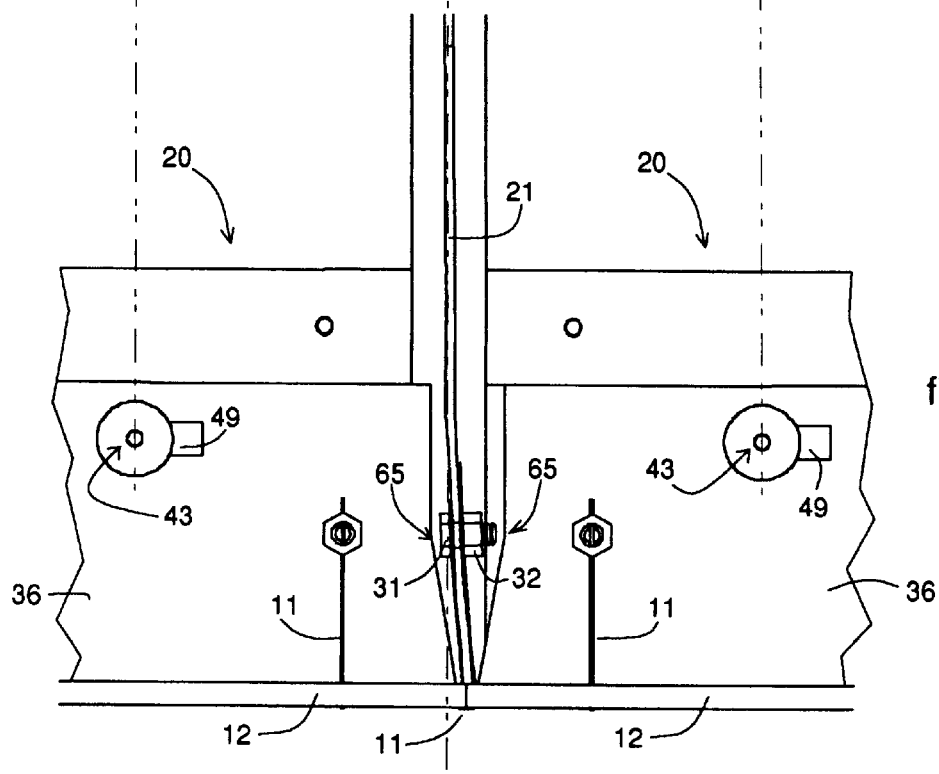

FIG. 16a and FIG. 16b show a top view of two mutually adjacent screen panels 12 which are held together by a joining wire 11 which is fixed to a vertical attachment plate 21 by means of a bolt 31 and a nut 32. It is also possible to see two mutually adjacent horizontal attachment plates 20, each with a fixed joining wire 11 and a pop-rivet joint 43 between the plates 34, 35, 36 of the horizontal attachment plate 20.

In FIG. 16a, the conditions are assumed to be optimal, i.e. correct installation at the nominal ambient temperature using components of nominal dimensions, so that the vertical attachment plate 21 remains flat.

This is in contrast to FIG. 16b, in which the conditions are not optimal. The two screen panels 12 have been pulled to the right, the flexible vertical attachment plate 21 and the joining wire 11 bending to the right but still holding the screen panels 12 together. The top plastic plates 36 of the horizontal attachment plates 20 also slide to the right, as can be seen from the slots 49 which have moved. The top plastic plates 36 do not completely adjoin the vertical attachment plate 21, in order to make such a movement to the right and also to the left possible, and for this purpose they have, on the short side, an edge 65 which is not rectilinear but rather is broken away. Also in order to allow such movements to the right and to the left, in particular for the joining wires 11 and bolts 31 or nuts 32, as shown in FIG. 7 there are cutouts 50 in the middle metal plate 35 and cutouts 51 in the bottom metal. plate 34 of the horizontal attachment plate 20.

The movements and/or deformations of components as described above with reference to FIGS. 15a, 15b and 15c, on the one hand, and FIGS. 16a and 16b, on the other hand, may take place simultaneously.

Using the components described above, the projection screen 9 is installed as described below.

Firstly, by means of horizontal profile sections 15, vertical profile sections 16, lateral profile sections 17, attachment elements 27, coach bolts and nuts, the non-deformable, supporting section, i.e. a chassis frame 14, is built up to the prescribed height and width of the projection screen 9 and is made level. There are numerous possibilities for further installation of the projection screen 9, but preferably the first step is to attach the horizontal and vertical attachment plates 20, 21 to the chassis frame 14 in advance by pushing them into the slots 25, 26 which are provided for this purpose on the front sides of the horizontal and vertical profile sections 15, 16 of the chassis frame 14 and fixing them in place using bolts 52, 58 and nuts 53, 59. Then the screen panels 12 are put in place, preferably starting at the top. The first screen panel 12 is preferably placed in the right-hand or left-hand top corner, then the next panel is placed immediately next to it, continuing horizontally in this way as far as the edge of the projection screen 9, then continuing further downwards. A screen panel 12 is in each case firstly suspended from the horizontal attachment plate 20 which is situated above it and is then attached to any screen panels 12 which touch it and have already been put in place by fixing by means of joining wires 11, bolts 31 and nuts 32 in the manner described above. At the edges of the projection screen 9, a screen panel 12 is only attached to an attachment plate 20, 21.

Second Preferred Embodiment

Figure 17:
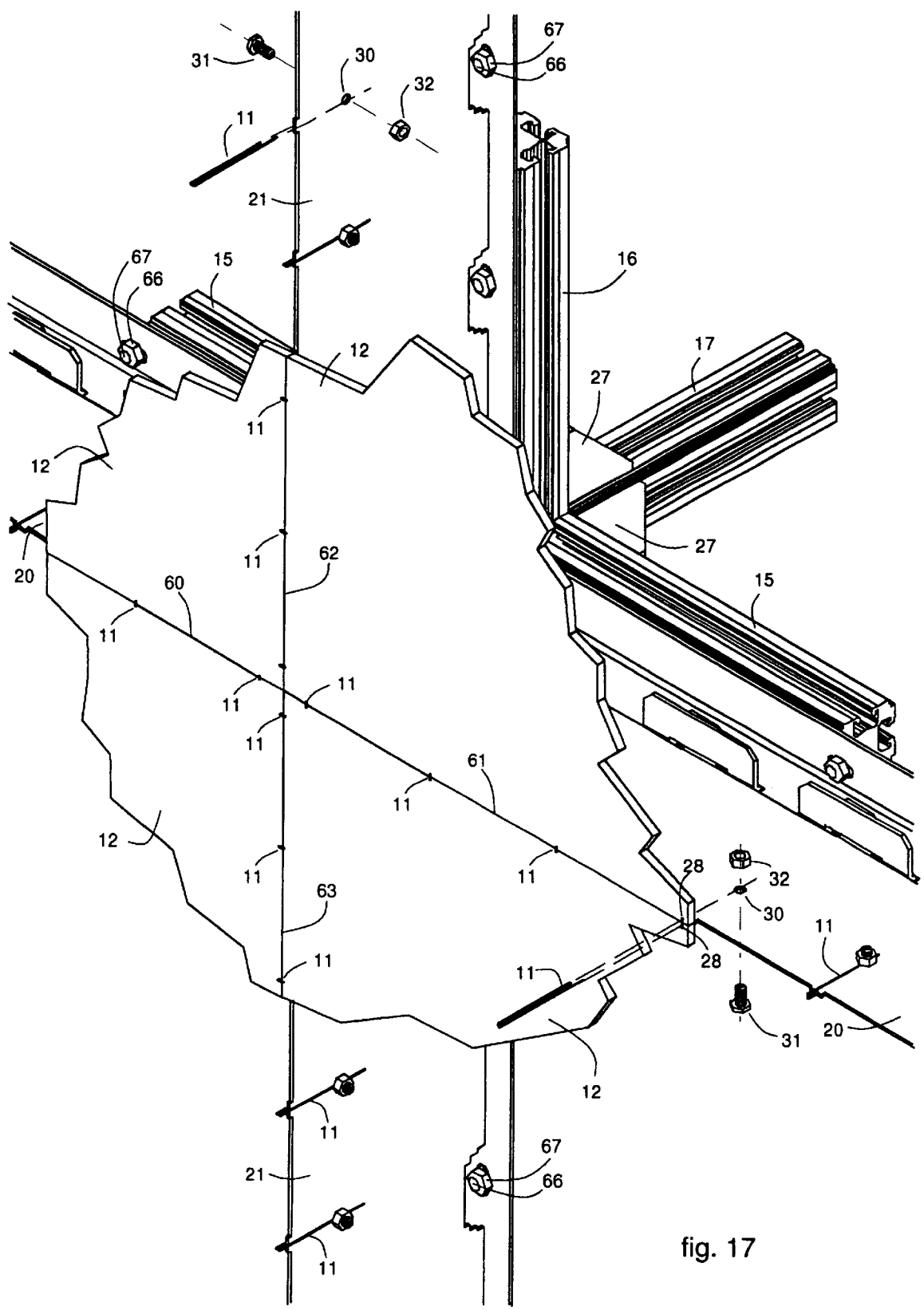
FIG. 17 is, of a second embodiment, a perspective view of four screen panels, which have been cut away and are attached to one another, at the intersection of horizontal and vertical attachment plates.

FIG. 17 shows the intersection between two horizontal profile sections 15, two vertical profile sections 16 and a lateral profile section 17. A single extruded section is used for the horizontal, vertical and lateral profile sections 15, 16 and 17. In this second preferred embodiment, the horizontal profile sections 15 are longer than the vertical profile sections 16 to obtain an aspect ratio of 4/3. The profile sections 15, 16, 17 have four equal sides in which a T-slot is provided for fixing profile sections to one another or for the fixation of other items to the profile sections. At the location where horizontal and vertical profile sections 15, 16 come together at an intersection as shown in FIG. 17 or at an edge of the projection screen 9, the horizontal and vertical profile sections 15, 16 are all fixed to the same lateral profile section 17 via attachment elements 27 and using coach bolts and nuts as described in BE-9601054.

The second embodiment differs from the first embodiment in the attachment plates 20, 21, the profile sections 15, 16, 17 and the attachment between said attachment plates 20, 21 and said profile sections 15, 16, 17. The screen panels 12 and their attachment to one another and to attachment plates 20, 21 by means of joining wires 11, and the joining wires 11 themselves are identical for both preferred embodiments, and therefore is referred here to the description of these common and identical parts of both embodiments in the description of the first embodiment.

FIG. 18a shows the two parts of a horizontal attachment plate 20, being a top metal plate 68 and a bottom metal plate 69.

The bottom metal plate 69 has two perpendicular planes, being a plane 70 and a raised edge 71. In the raised edge 71 are holes 72 for the fixation of the bottom metal plate 69 to the supporting structure 13 e.g. by means of bolts 66 and nuts 67 as shown in FIG. 17. In the plane 70 of the bottom metal plate 69 are multiple combinations of a hole 73, a lip 74 and a slot 75, these said combinations being parts of the join of the bottom metal plate 69 to the top metal plate 68 as further described.

The top metal plate 68 comprises a plane 76 with multiple perpendicular lips 77 at the rear edge. In the plane 76 are multiple holes 30 for the attachment of joining wires 11 in order to attach mutually contacting screen panels 12 to the front edge of the top metal plate 68 according to the present invention and as shown in FIG. 5 and FIG. 17. Optional protrusions 78 keep the attached screen panels 12 away from the front edge of the top metal plate 68, making such a said top metal plate 68 a lesser obstruction for the light rays from projectors 22 to the screen 10.

FIGS. 18b and 18c show how the top metal plate 68 and the bottom metal plate 69 of a horizontal attachment plate 20 according to the second embodiment, join together. The perpendicular lips 77 of the top metal plate 68 fit into the slots 75 of the bottom metal plate 69, as is also shown in FIG. 18a by means of a dashed arrow 79. Once the perpendicular lips 77 of the top metal plate 68 are fully pushed into the slots 75 of the bottom metal plate 69, the top metal plate 68 can, with reference to the bottom metal plate 69 carry out a guided longitudinal movement limited by the length of the slots 75, and hinge over maximum 90 degrees.

In the front edge of a bottom metal plate 69 are multiple cutouts 51. The cutouts 51 correspond to the holes 30 in a top metal plate 68. A cutout 51 leaves space for the attachment of a joining wire 11 by means of a bolt 31 and a nut 32.

Figure 19A:
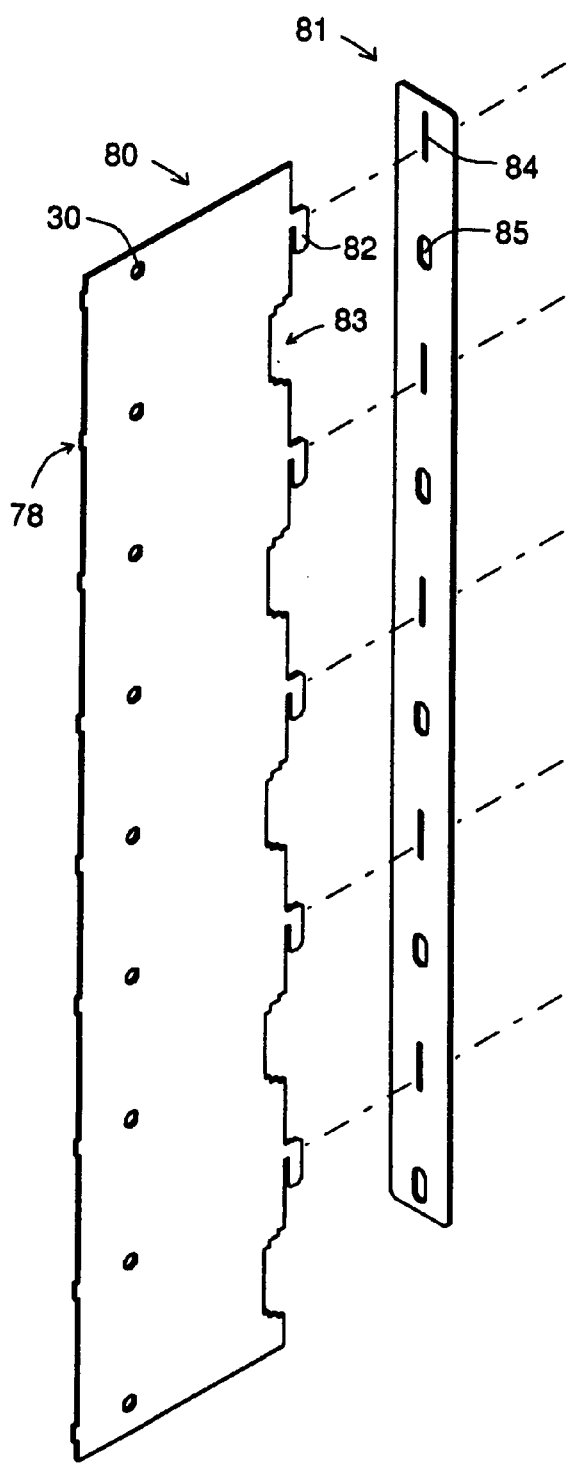
FIGS. 19a and 19b are a three-dimensional, exploded illustration of a vertical attachment plate of the second embodiment.

FIG. 19a shows the two parts of a vertical attachment plate 21 according to the second embodiment, being a front metal plate 80 and a rear metal plate 81.

At the rear edge of a front metal plate 80 are multiple hooks 82 and multiple cutouts 83. In the rear metal plate 81 are multiple slots 84 and multiple holes 85. The holes 85 are provided for the fixation of the rear metal plate to a vertical profile section 16 of the supporting structure 13 by means of, e.g., bolts 66 and nuts 67 as shown in FIG. 17. The multiple hooks 82 of a front metal plate 80 correspond to the multiple slots 84 of a rear metal plate 81 as shown in FIG. 19a.

Figure 19B:
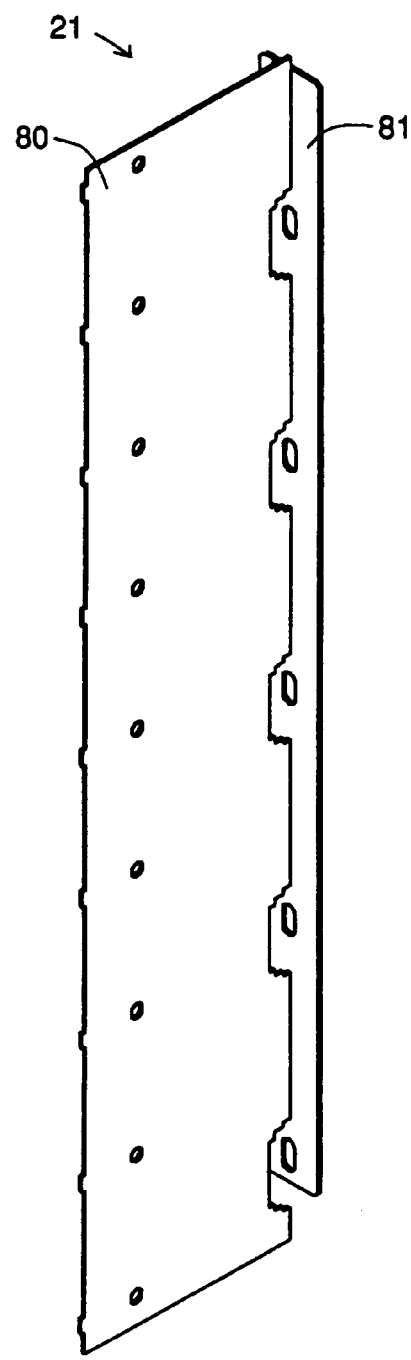

FIG. 19b shows a vertical attachment plate 21 according to the second embodiment. The front metal plate 80 hangs by means of its hooks 82 into the slots 84 of the rear metal plate 81 and can with reference to the said rear metal plate 81 carry out a guided longitudinal movement limited by the length of the slots 84, and it can hinge within the said slots 84. As shown in FIG. 17, the cutouts 83 in the rear metal plate 80 leave space for the attachment bolts 66 and nuts 67.

In the front metal plate 80, multiple holes 30 are provided for the attachment of joining wires 11 in order to attach mutually contacting screen panels 12 to the front edge of the said front metal plate 80 as shown in FIG. 17. Optional protrusions 78 keep the attached screen panels 12 away from the front edge of the top metal plate 68, making such a said top metal plate 68 a lesser obstruction for the light rays from projectors 22 to the screen 10.

Figure 20A:
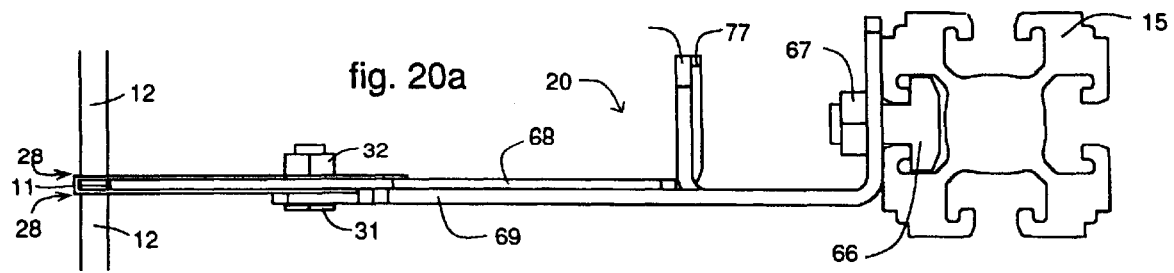
FIGS. 20a and 20b illustrate how, in the second embodiment, the horizontal attachment plate is deformed in the event of a vertical movement of the screen with respect to the supporting structure.
Figure 20B:
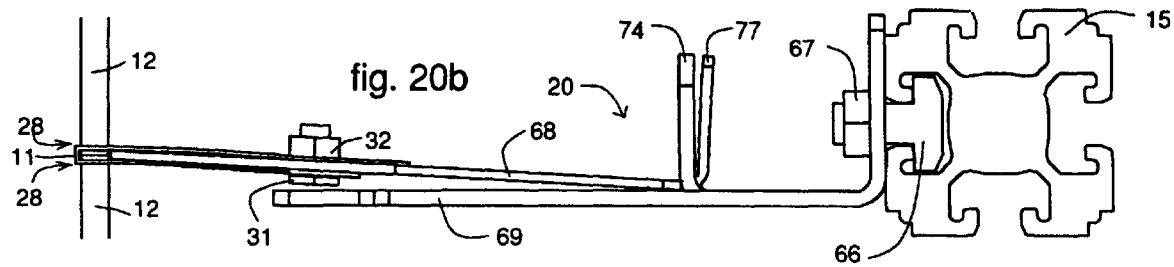

FIGS. 20a and 20b show a side view of two screen panels 12 which are situated one above the other and are held together by means of a joining wire 11 which is fixed to a horizontal attachment plate 20 according to the second embodiment by means of a bolt 31 and a nut 32.

In FIG. 20a, the conditions are assumed to be optimal, i.e. correct installation at the nominal ambient temperature using components of nominal dimensions, so that the top metal plate 32 is parallel to the bottom metal plate 68 and only supports a screen panel 12 which stands above it.

This contrasts with FIG. 20b, in which the conditions are not optimal. In FIG. 20b, the two screen panels 12 have been pulled upwards, and the top metal plate 68 has hinged clockwise on to the bottom metal plate 69 while still holding together the screen panels 12.

Figure 21A:
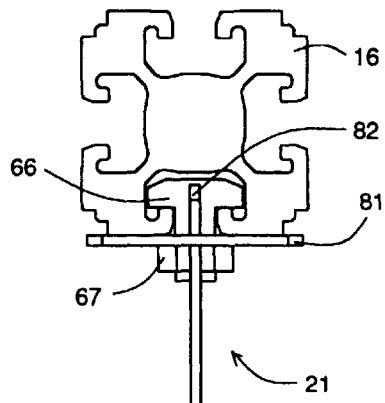
FIGS. 21a and 21b illustrate how, in the second embodiment, the vertical attachment plate deforms in the event of a horizontal movement of the screen with respect to the supporting structure.
Figure 21B:
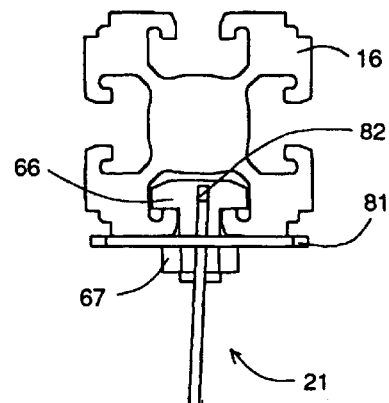

FIGS. 21a and 21b show a top view of two mutually adjacent screen panels 12 which are held together by a joining wire 11 which is fixed to a vertical attachment plate 21 of the second embodiment by means of a bolt 31 and a nut 32.

In FIG. 21a, the conditions are assumed to be optimal, i.e. correct installation at the nominal ambient temperature using components of nominal dimensions, so that the front metal plate 80 is at right angles to the rear metal plate 81.

This contrasts with FIG. 21b, in which the conditions are not optimal. The two screen panels 12 have been pulled to the left, and the front metal plate 80 has hinged clockwise on to the rear metal plate 81 while still holding the screen panels 12 together.

The movements and/or deformations of components as described above with reference to FIGS. 20a and 20b on the one hand, and FIG. 21a and FIG. 21b, on the other hand, may take place simultaneously.

Using the components of the second preferred embodiment described above, the projection screen 9 can be installed in a similar way as described above for the installation of a projection screen 9 by means of the components of the first preferred embodiment, the joining between attachment plates 21, 21 and the profile section 15, 16, 17 being the main difference.

What is claimed is:

1. A projection screen for image reproduction devices, comprising:

a screen assembled from a plurality of screen panels;

a plurality of attachment plates; and a supporting structure, wherein the attachment plates each include at least one part to which screen panels are joined, mutually contacting screen panels and attachment plates are drawn together by joining wires, the attachment plates are joined to the supporting structure, and of at least some of the attachment plates, the at least one part to which screen panels are joined can linearly move in a direction along a line of intersection between a plane of the respective attachment plate and a plane defined by a surface of the screen panels and can bend in a direction perpendicular to the plane of the respective attachment plate or can hinge in a direction perpendicular to the plane of the respective attachment plate onto the supporting structure or onto another part of the attachment plate that is immovably joined to the supporting structure.

2. A projection screen according to claim 1, wherein the joining wires are attached with both ends to a same attachment plate.

3. A projection screen according to claim 1, wherein the plurality of attachment plate includes horizontal attachment plates and vertical attachment plates.

4. A projection screen according to claim 3, wherein at least some of the horizontal attachment plates include a plurality of plates that are joined to one another and one plate of which is attached to the supporting structure and another plate of which is attached to the screen panels.

5. A projection screen according to claim 4, wherein the one plate to which the screen panels are attached is metal.

6. A projection screen according to claim 3, wherein at least some of the vertical attachment plates include a single plate attached to the supporting structure and to the screen panels.

7. A projection screen according to claim 3, wherein at least some of the vertical attachment plates include a plurality of plates joined to one another and one plate of which is attached to the supporting structure and another plate of which is attached to the screen panels.

8. A projection screen according to claim 4 or 7, wherein the one plate to which the screen panels are attached is a non-transparent, black and matt plastic which has approximately a same coefficient of expansion as that of a material used for the screen panels.

9. A projection screen according to claim 3, wherein each horizontal attachment plate, apart from a top one, bears the weight of the screen panel which is attached thereto and above it.

10. A projection screen according to claim 3, wherein top horizontal attachment plates bear the weight of all the screen panels situated in a column beneath them, and the other horizontal attachment plates do not bear weight.

11. A projection screen according to claim 3, wherein bottom horizontal attachment plates bear the weight of all the screen panels situated in a column above them, and the other horizontal attachment plates do not bear weight.

12. A projection screen according to one claim 1, wherein the screen panels are optical panels including at least one of a Fresnel lens, a lenticular lens, and a combination of the two.

13. A projection screen according to claim 1, wherein the attachment plates include small holes for fixing the joining wires.

14. A projection screen according to claim 1, wherein the joining wires are U-shaped.

15. A projection screen according to claim 1, wherein the joining wires are metal or plastic.

16. A projection screen according to claim 1, wherein each joining wire is fixed to the attachment plates by a bolt and a nut.

17. A projection screen according to claim 1, wherein the attachment plates include deformable and non-deformable attachment plates, the deformable plates being bendable or including at least two parts which can longitudinally move with respect to one another or including at least two parts hinged to one another.

18. A projection screen according to claim 17, wherein columns of vertical attachment plates stand one above the other, and at least one column includes vertical attachment plates that all are non-deformable.

19. A projection screen according to claim 17, wherein rows of mutually adjacent horizontal attachment plates includes at least one row in which all the horizontal attachment plates are non-deformable.

20. A projection screen according to claim 1, wherein attachment points for projectors are provided in the supporting structure.

21. A projection screen according to claim 1, wherein the screen panels lie in one plane.

22. A projection screen according to claim 1, wherein the screen panels are planar and the surface formed by the screen panels is curved.

23. A projection screen according to claim 1, wherein the screen panels and the surface formed by the screen panels are curved.

24. A projection screen according to claim 1, wherein the screen panels comprise a plurality of layers, of which at least one layer is attached to the attachment plates by the joining wires.

25. A projection screen according to claim 1, wherein any point of the screen can move in any direction within the surface of the screen panels, the move guided in two directions.

26. A projection screen according to claim 1, wherein all the screen panels have the same dimensions.

* * * * *